US011585756B2

(12) United States Patent
Munro et al.

(10) Patent No.: US 11,585,756 B2
(45) Date of Patent: Feb. 21, 2023

(54) METHODS AND SYSTEMS FOR DETERMINING AT LEAST ONE THERMAL PROPERTY OF A SAMPLE

(71) Applicant: BRIGHAM YOUNG UNIVERSITY, Provo, UT (US)

(72) Inventors: Troy Munro, Orem, UT (US); Ryker Haddock, Provo, UT (US)

(73) Assignee: BRIGHAM YOUNG UNIVERSITY, Provo, UT (US)

(*) Notice: Subject to any disclaimer, the term of this patent is extended or adjusted under 35 U.S.C. 154(b) by 903 days.

(21) Appl. No.: 16/464,929

(22) PCT Filed: Nov. 30, 2017

(86) PCT No.: PCT/US2017/063923
§ 371 (c)(1),
(2) Date: May 29, 2019

(87) PCT Pub. No.: WO2018/102540
PCT Pub. Date: Jun. 7, 2018

(65) Prior Publication Data
US 2020/0011798 A1 Jan. 9, 2020

Related U.S. Application Data

(60) Provisional application No. 62/428,852, filed on Dec. 1, 2016.

(51) Int. Cl.
G01N 21/64 (2006.01)
G01N 21/63 (2006.01)
(52) U.S. Cl.
CPC ....... G01N 21/6408 (2013.01); G01N 21/636 (2013.01); G01N 2201/061 (2013.01); G01N 2201/0691 (2013.01)

(58) Field of Classification Search
CPC ............ G01N 21/6408; G01N 21/636; G01N 2201/061; G01N 2201/0691; G01N 21/6428; G01N 2021/6439; G01N 21/6456
See application file for complete search history.

(56) References Cited

U.S. PATENT DOCUMENTS 8,037,945 B2 * 10/2011 Fink ....................... G01Q 30/02
173/105
2006/0153269 A1 7/2006 Lakestani et al.
2007/0038969 A1 2/2007 Pitkary et al.
2007/0059754 A1 3/2007 Kordunsky et al.

OTHER PUBLICATIONS

International Search Report and Written Opinion for International Application No. PCT/US2017/063923 dated May 9, 2018.
(Continued)

Primary Examiner — David P Porta
Assistant Examiner — Fani Polyzos Boosalis
(74) Attorney, Agent, or Firm — Dorsey & Whitney LLP

(57) ABSTRACT

Embodiments disclosed herein relate to methods and systems for determining thermal properties of materials by using frequency modulated pump light intensity to cyclically heat a sample, and using probe light to induce fluorescent signals from fluorescent indicators on the surface of the material during the cyclic 5 heating. The methods and systems utilize the phase delay between the frequency modulated pump light and the corresponding fluorescent signals to determine the thermal properties of the material at one or more locations on the material sample.

20 Claims, 8 Drawing Sheets

(56) References Cited

OTHER PUBLICATIONS

U.S. Appl. No. 62/428,852, filed Dec. 1, 2016.
Munro, Troy et al., "CdSe/ZnS quantum dot fluorescence spectra shape-based thermometry via neural network reconstruction", Journal of Applied Physics, 119, Jun. 6, 2016, p. 214903-1-214903-10.
Munro, Troy et al., "Thermophysical Properties of Thin Fibers via Photothermal Quantum Dot Fluorescence Spectral Shape-based Thermometry", International Journal of Heat and Mass Transfer, https://scholarsarchive.byu.edu/cgi/viewcontent.cgi?article=2900&context=facpub> retrieved Feb. 7, 2018, Jun. 8, 2017, pp. 2-11.
Zhao, Dongliang et al., "Measurement Techniques for Thermal Conductivity and Interfacial Thermal Conductance of Bulk and Thin Film Materials", Journal of Electronic Packaging, Oct. 19, 2016, pp. 040802-10.
Liu, et al., "Termperature-sensitive photoluminescent CdSe—ZnS polymer composite film for lick-in photothermal characterization". Journal of Applied Physics, 119, https://doi.org/10.1063/1.4953591, last accessed Sep. 30, 2022, 2016, 6 pages.
Liu, et al., "Wideband fluorescence-based thermometry by neural network recognition: Photothermal application with 10 ns times resolution", Journal of Applied Physics, 118, http://dx.doi.org/10.1063/1.4935277, last accessed Sep. 30, 2022, 2015, 5 pages.
Salazar, et al., "Accurate measurements of the thermal diffusivity of thin filaments by lock-in thermography", Journal of Applied Physics, 107, https://aip.scitation.org/doi/10.1063/1.3309328, last accessed Sep. 30, 2022, 2010, 4 pages.

\* cited by examiner

METHODS AND SYSTEMS FOR DETERMINING AT LEAST ONE THERMAL PROPERTY OF A SAMPLE

CROSS-REFERENCE TO RELATED APPLICATIONS

This application claims priority to U.S. Provisional Application No. 62/428,852 filed on 1 Dec. 2016, the disclosure of which is incorporated herein, in its entirety, by this reference.

BACKGROUND

Materials tend to degrade over time. Some materials may be intended to be, or may originally be, substantially homogenous. Due to one or more conditions or processes, such as oxidation, reduction, radiation, dissolution, hydration, etc., the homogenous material may degrade and lose homogeneity to include one or more degradation products therein. Information about the degradation may indicate the useful life or quality of the homogenous material.

Radioactive materials tend to be hard on equipment. For example, gamma rays, alpha particles, and/or heat emitted from radioactive material may shorten the lifespan of equipment in the proximity of the radioactive material. Also, radioactive materials, such as fuel rods, pellets, or cladding thereof may undergo degradation during use, such as during nuclear power production.

SUMMARY

Embodiments disclosed herein relate to methods and systems for determining thermal properties of materials by using frequency modulated pump light, fixed intensity probe light, and fluorescent indicators. In an embodiment, a method for determining a thermal property of one or more portions of a material sample is disclosed. The method includes (a) disposing a fluorescent indicator on a surface of the material sample. The method includes (b) illuminating a surface of the material sample with an infrared light from a pump light source and a probe light of a probe light source at an initial location on the surface. The method includes (c) modulating an intensity of the infrared light at an initial modulation frequency. The method includes (d) detecting fluorescent signals from the fluorescent indicator at a photodetector, over a duration, responsive to fluorescent emissions induced via the probe light from the probe light source. The method includes (e) altering the initial modulation frequency of the infrared light to an altered modulation frequency. The method includes (f) performing acts (b)-(e) at the altered modulation frequency. The method includes (g) determining the thermal property partially based on the fluorescent emissions.

In an embodiment, another method for determining a material property is disclosed. The method includes (a) disposing a fluorescent indicator on a surface of a material sample. The method includes (b) illuminating the surface of the material sample with an infrared light from a pump light source and a probe light from a probe light source at an initial location on the surface, wherein probe light is emitted at a substantially fixed intensity and is concentrically disposed within a beam of the infrared light. The method includes (c) modulating an intensity of the infrared light at an initial modulation frequency. The method includes (d) detecting fluorescent signals from the fluorescent indicator at a photodetector, over a duration, responsive to fluorescent emissions induced via illumination of the fluorescent indicator by the probe light, wherein fluorescent signals have a phase delay at the initial modulation frequency compared to the infrared light, and wherein the infrared light, the probe light, and the photodetector are disposed in a commercial off-the-shelf high definition Blu-ray optical pick-up ("optical pick-up"). The method includes (e) determining the phase delay in a pattern of the intensity of the fluorescent signals with respect to the initial modulation frequency of the infrared light, wherein the pattern of fluorescent signals corresponds to a phase delay at the initial modulation frequency of the infrared light. The method includes (f) determining an amplitude of the pattern of fluorescent signals detected at the photodetector. The method includes (g) altering the initial modulation frequency to an altered modulation frequency having a higher or lower frequency than a current modulation frequency, and performing acts (d)-(f) at the altered modulation frequency. The method includes (h) determining the thermal diffusivity of one or more portions of the material sample at least partially based on the fluorescent emissions.

In an embodiment, a system for determining a thermal diffusivity of a material sample is disclosed. The system includes an optical arrangement including a pump light source, a probe light source, and a photodetector. The probe light source is configured to emit probe light. The pump light source is configured to emit infrared light. The system includes a support configured to have material samples mounted there over. The system includes one or more first actuators configured to move one or more of the optical arrangement or the support with respect to the other. The system includes one or more second actuators positioned and configured to move one or more of the support or the optical arrangement with respect to the other. The system includes at least one controller operably coupled to the optical arrangement and the one or more first and second actuators. The at least one controller is configured to activate the one or more second actuators to move one or more of the optical arrangement or the support with respect to each other. The at least one controller is configured to direct the probe light source to emit the probe light. The at least one controller is configured to direct the pump light source to emit the infrared light and modulate an intensity of the infrared light according to a selected frequency. The at least one controller is configured to receive signals from the photodetector corresponding to fluorescent signals detected at the photodetector. The at least one controller is configured to determine a thermal diffusivity of the material sample at one or more locations thereon using the received signals corresponding to the detected fluorescent signals.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1:
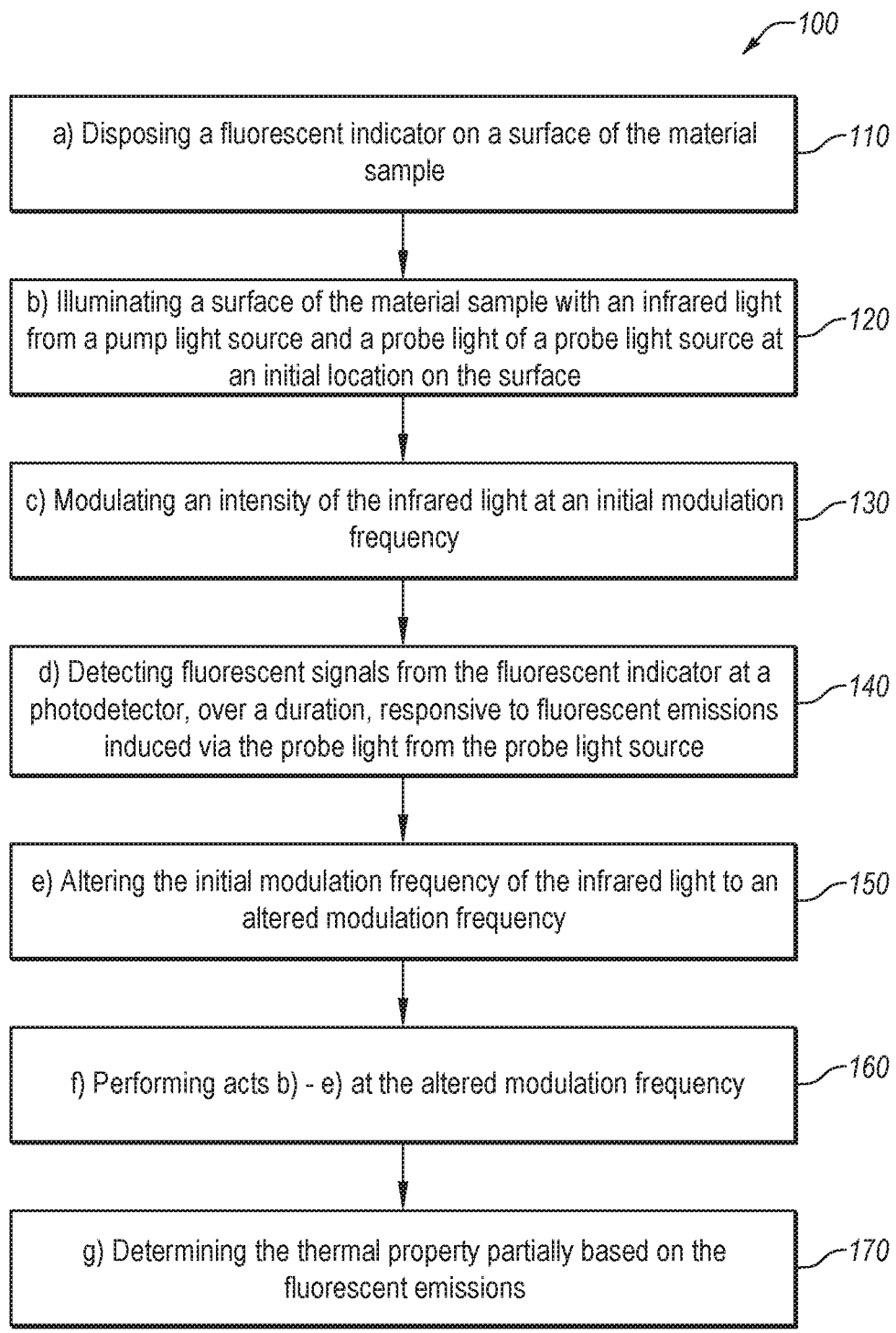
FIG. 1 is a flow chart of a method for determining a thermal property of one or more portions of a material sample, according to an embodiment.

Embodiments disclosed herein relate to fluorescence thermometry methods and systems for determining thermal properties of material samples. Different materials diffuse heat at different rates. The heat diffusivity of a material may be characteristic of a composition of the material itself. Information about a homogeneity of the material can be determined by examining the diffusivity rate(s) of the material. By studying material homogeneity or lack thereof, much can be learned about the materials and their use, such as formation of degradation products or differences in materials (e.g., trees, polymers, metals such as nuclear fuels or shielding, etc.).

The methods and systems disclosed herein utilize the photothermal effect using thermal waves generated by cyclically (e.g., sinusoidally) varying pump light delivered to an area of a material sample. As this irradiated area is cyclically heated, the thermal properties of the material may be determined. For example, the thermal wave may experience both an attenuation and phase delay that are functions of the material's properties, the distance from the modulated source, and the modulation frequency.

The fluorescent-based techniques disclosed herein periodically modulate the intensity of the pump light (e.g., infrared heating laser) and record the corresponding phase delayed temperature change of the irradiated (e.g., heated) area, by observing fluorescent emissions made responsive to a probe light (e.g., color laser beam). The probe light is shone on the irradiated area and causes a fluorescent indicator in the irradiated area to fluoresce on the sample surface. The thermal diffusivity of the material in the irradiated area can be determined by examining the modulation of the fluorescent emissions and comparing the same to the modulation of the heating laser. Differences in thermal diffusivity from location to location on the sample, as observed via the fluorescent emissions stimulated by the probe light, can indicate that different materials are present in the sample.

The methods and systems disclosed herein employ an algorithm for determining thermal diffusivity of a material by examining fluorescent emissions produced while modulating heat applied to the sample. The algorithm compares the modulation of the pump light (e.g., heating laser) emitted to a location and the correspondingly modulated pattern of the fluorescent signals detected from fluorescent markers in the location responsive to a probe light (that is not modulated) shone on the location, to determine a phase delay therebetween. The acts are repeated at different pump light frequencies. The algorithm uses the phase delays and amplitudes determined at the different modulation frequencies to solve for the thermal diffusivity of the material sample at a specific location. The thermal diffusivity can be used to determine if the material sample has material inconsistencies therein. By studying such material inconsistencies, much can be learned about the materials and their use, such as formation of degradation products or differences in materials (e.g., trees, polymers, metals such as nuclear fuels or shielding, etc.).

FIG. 1 is a flow chart of a method 100 of determining a thermal property of one or more portions of a material sample, according to an embodiment. The method 100 includes the act 110 of (a) disposing a fluorescent indicator on a surface of the material sample. The method 100 includes the act 120 of (b) illuminating a surface of the material sample with an infrared light from a pump light source and a probe light of a probe light source at an initial location on the surface. The method 100 includes the act 130 of (c) modulating an intensity of the infrared light at an initial modulation frequency. The method 100 includes the act 140 of (d) detecting fluorescent signals from the fluorescent indicator at a photodetector, over a duration, responsive to fluorescent emissions induced via the probe light from the probe light source. The method 100 includes the act 150 of (e) altering the initial modulation frequency of the infrared light to an altered modulation frequency. The method 100 includes the act 160 of (f) performing (b)-(e) at the altered modulation frequency. The method 100 includes the act 170 of (g) determining the thermal property partially based on the fluorescent emissions.

The method 100 includes the act 110 of (a) disposing a fluorescent indicator on a surface of the material sample. In some embodiments, disposing the fluorescent indicator on a surface of the material sample may include disposing an indicator material that emits fluorescent light responsive to irradiation with probe light. The material sample may include one or more of wood(s), metal(s), polymer(s), etc. For example, disposing the fluorescent indicator on a surface of the material sample may include disposing the fluorescent indicator on a radioactive fuel sample, such as a portion or cross-section of an at least partially spent nuclear fuel rod or pellet. The fluorescent indicator may be selected to fluoresce at a specific wavelength over selected temperature profile or in response to a selected wavelength of probe light. In some embodiments, the fluorescent indicator may include a fluorescent dye or quantum dots. The fluorescent dye or quantum dots may be selected to emit fluorescent radiation responsive to a specific wavelength of probe light. For example, the fluorescent dye or quantum dots may emit fluorescent light responsive to irradiation with blue light (wavelength of 405 nm-495 nm).

In some embodiments, the fluorescent indicator includes a coating of quantum dots on the material sample. The quantum dots may be semiconductors (such as III-V types) where the band gap of the material and its size cause a quantum confinement phenomena, which may result in a fluorescent color that is dependent on the size of the dot, with larger dots being more red. The emitted, almost Gaussian shaped fluorescent spectra emitted from the quantum dots is temperature dependent, as are several spectral features (peak intensity, peak wavelength, integrated intensity) of the light emitted from the quantum dots responsive to illumination with probe light. Fluorescence of quantum dots are sensitive to temperature for several reasons, with the most dominant being that the number of non-light emitting processes increases as temperature increases. The quantum dots may fluoresce with different characteristics (e.g., intensities) at different temperatures.

In some embodiments, disposing the fluorescent indicator on a surface of the material sample may include painting the surface of the material sample with the fluorescent indicator. For example, disposing a fluorescent indicator on the surface of the material sample may include disposing quantum dots on the surface of the material sample, such as by applying a slurry or solution containing the quantum dots to the material sample. The slurry or solution may be dried to leave the quantum dots on the surface of the material sample.

The method 100 includes the act 120 of (b) illuminating a surface of the material sample with an infrared light from a pump light source and a probe light of a probe light source at an initial location on the surface. In some embodiments, the pump light source may include a light source for heating the material sample, such as an infrared laser. For example, illuminating the surface of the material sample with the infrared light from the pump light source and the probe light of the probe light source at the initial location on the surface may include illuminating the surface with the infrared laser. In some embodiments, the probe light source may include a light source for emitting the probe light onto the material sample, such as a color laser. For example, illuminating the surface of the material sample with the infrared light from the pump light source and the probe light of the probe light source at the initial location on the surface may include illuminating the surface with the color laser. The color laser may emit probe light in a selected color (e.g., wavelength(s)), such as blue, red, etc. The color of the probe light may be selected to cause fluorescent emission in the fluorescent indicator, such as emissions at a selected wavelength. In some embodiments, the probe light source and the pump light source may be disposed on an optical arrangement, such as a commercial off the shelf Blu-ray optical pick-up ("optical pick-up"). For example, the off-the-shelf Blu-ray optical pick-up (e.g., containing the color laser) may be modified to include the pump light source (e.g., infrared laser).

The probe light source may be positioned to emit the probe light concentrically within the pump light emitted from the pump light source. For example, illuminating a surface of the material sample with an infrared light from a pump light source and a probe light of a probe light source at an initial location on the surface may include illuminating the surface of the material sample with the infrared laser and the color laser at the initial location on the surface, wherein the color laser emits colored light at a substantially fixed intensity and the colored light is concentrically disposed within a beam of infrared light from the infrared laser.

In some embodiments, illuminating the surface of the material sample with the infrared light from the pump light source and the probe light of the probe light source at the initial location on the surface may include illuminating the surface of the material sample with infrared light at an initial intensity (e.g., and/or frequency) and probe light at a constant (e.g., fixed) frequency at the initial location. In some embodiments, illuminating the surface of the material sample with the infrared light from the pump light source and the probe light of a probe light source at the initial location on the surface may include illuminating the surface of the material sample with the infrared laser and the color laser at an initial location on the surface, wherein the beam of the color laser is emitted at a fixed intensity and is concentrically disposed within the beam of the infrared laser or is targeted to converge at the surface of the material sample with the pump light such that the infrared laser and the color laser spots are concentric at the surface of the material.

The method 100 includes the act 130 of (c) modulating an intensity of the infrared light at an initial modulation frequency. Modulating the intensity of the infrared light at the initial modulation frequency may include initiating a sinusoidal modulation of the infrared radiation (e.g., pump light) emitted from the pump light source. For example, modulating the intensity of the infrared light at the initial modulation frequency may include modulating the intensity of the infrared beam in a sinusoidal pattern of increasing and decreasing intensities. Modulating the intensity of the infrared light at the initial modulation frequency may be effective to cyclically heat the material sample (and fluorescent indicator thereon) in the sinusoidal pattern. Modulating the intensity of the infrared light at the initial modulation frequency may be effective to modulate the temperature of the material sample by 5° C. or less (e.g., 5° C., 4° C., 3° C., 2° C., or 1° C.). For example, the initial modulation frequency of the infrared light may correspondingly modulate the temperature of the material sample in the illuminated region by 5° C. or less.

The initial frequency of the sinusoidal pattern may be a lowest frequency, such as at least 1 Hz, or in a range of 100 Hz to 10,000 Hz. In some embodiments, modulating the intensity of the infrared light at the initial modulation frequency may include causing the pump light source to modulate the infrared light, with a controller.

By sinusoidally modulating the intensity of the light, the temperature of the material at the location irradiated responds in an oscillatory manner at the same frequency. This temperature variation is often called a thermal wave, and it experiences both an attenuation and phase delay that are functions of the material's properties, the distance from the modulated source, and the modulation frequency. The material heats and cools in a pattern corresponding to the modulation frequency in a delayed manner due to the time it takes for the heat provided by the infrared light to diffuse through the material. Changes in the intensity (e.g., as noted by the amplitude and phase of the pattern) of fluorescent emissions from fluorescent indicators on the material may aid in determining the thermal property (e.g., thermal diffusivity) of the material in the irradiated location. Differences in the same thermal property at different locations on a material sample may indicate that the material sample is non-homogenous (e.g., includes more than one material therein). For example, the material sample may contain one or more of metals (e.g., alloys), metal oxides, binder(s), precipitates therein, or hydrides therein. In some embodiments, the sample may include a triso fuel, cladding, and one or more degradation products thereof, such as hydrides. By identifying differing thermal properties at different locations, it can be shown that the material in at least one of the locations differs from the material in the remaining locations.

The method 100 includes the act 140 of (d) detecting fluorescent signals from the fluorescent indicator at a photodetector, over a duration, responsive to fluorescent emissions induced via the probe light from the probe light source. A group or pattern of fluorescent signals (e.g., emissions) induced via the probe light from the probe light source may exhibit a phase delay corresponding to the modulation frequency of the pump light (e.g., infrared light). The fluorescent intensity of the signals emitted from the fluorescent indicator illuminated on the material sample may be directly related to the temperature of the sample in the illuminated area. For example, as the temperature of the material sample increases, the intensity of the fluorescent radiation may decrease. Over relatively small variations in temperature (e.g., about 5° C. or less), and after an initial modulated increase in temperature, the change in intensity of the fluorescent emissions may be relatively linear. The methods disclosed herein may include examining the fluorescent signals produced in this linear cycle of heating and cooling with the pump light after the initial increase in temperature. For example, the duration may be in the linear portion of the heating and cooling cycles of the material sample.

In some embodiments, detecting fluorescent signals from the fluorescent indicator at the photodetector may include detecting fluorescent signals from the fluorescent indicator at a photodetector disposed on an optical arrangement, such as the commercial off-the-shelf Blu-ray optical pick-up. For example, the probe light source, the pump light source, an optical filter, and the photodetector may be disposed in the optical arrangement (e.g., optical pick-up). The fluorescent signals may be detected at the photodetector, converted to electrical signals (e.g., voltage) in the photodetector, and may be relayed to a controller or other data acquisition device. In some embodiments, detecting fluorescent signals from the fluorescent indicator at the photodetector, over the duration, responsive to fluorescent emissions induced via the probe light from the probe light source for a duration long enough to observe or demonstrate the pattern (e.g., sinusoidal pattern) in signals received responsive to the modulated frequency of the pump light.

The method 100 includes the act 150 of (e) altering the initial modulation frequency of the infrared light to an altered modulation frequency. In some embodiments, the initial modulation frequency may be any of the modulation frequencies disclosed herein. The altered modulation frequency may be different than the initial modulation frequency. Altering the initial modulation frequency of the infrared light to the altered modulation frequency may include increasing the modulation frequency or decreasing the modulation frequency of infrared light from the initial modulation frequency. In some embodiments, altering the initial modulation frequency of the infrared light to an altered modulation frequency may include altering the modulation frequency of the infrared light being emitted onto the material sample by an amount that renders the signals detected at the altered modulation frequency discernable from the initial modulation frequency. For example, altering the initial modulation frequency of the infrared light to the altered modulation frequency may include increasing the frequency or decreasing the frequency of infrared light from the initial frequency by a selected amount, such as 500 Hz, 600 Hz, 700 Hz, 1 kHz, 2 kHz, 3 kHz, 5 kHz, or 10 kHz. In some examples, an initial modulation frequency and a final modulation frequency may be selected. The altered modulation frequency(s) may be selected to provide a plurality (e.g., 4, 6, 8, 10, etc.) of substantially evenly spaced modulation frequencies between the initial and final modulation frequencies. The spacing may be logarithmic spacing. For example, the initial modulation frequency of 1 kHz and the final (altered) modulation frequency of 10 kHz may be selected, and the altered modulation frequencies may include 1.59 kHz, 2.51 kHz, 3.98 kHz, 6.31 kHz, and 10 kHz.

In some embodiments, altering the initial modulation frequency of the infrared light to the altered modulation frequency may include modulating the intensity of the infrared beam in a sinusoidal pattern of increasing and decreasing intensities. Modulating the intensity of the infrared light at the altered modulation frequency may be effective to modulate the temperature of the material sample by 5° C. or less (e.g., 5° C., 4° C., 3° C., 2° C., or 1° C.). For example, the altered modulation frequency of the infrared light may correspondingly modulate the temperature of the material sample in the illuminated region by 5° C. or less. The alteration of the temperature at the altered modulation frequency may be the same as the alteration of the temperature at the initial modulation frequency.

The method 100 includes the act 160 of (f) performing acts (b)-(e) at the altered modulation frequency. In some embodiments, performing acts (b)-(e) at the altered modulation frequency may include illuminating the surface of the material sample with infrared light from the pump light source and probe light of the probe light source at the initial location on the surface; modulating the intensity of the infrared light at the altered modulation frequency; detecting fluorescent signals from the fluorescent indicator at the photodetector after passing through an optical filter, over a duration, responsive to fluorescent emissions induced via the probe light from the probe light source; and altering the altered modulation frequency of the infrared light to an additional altered modulation frequency. The signals received at the photodetector corresponding to the altered modulation frequency may be relayed and stored in a controller or other data acquisition device.

In some embodiments, the duration over which the infrared light and probe light are emitted onto the surface and over which detecting the fluorescent signals take place at the altered modulation frequency may be the same as the duration used for the initial modulation frequency.

The method 100 includes the act 170 of (g) determining the thermal property partially based on the fluorescent emissions. In some embodiments, determining the thermal property partially based on the fluorescent emissions may include determining the thermal diffusivity of the material sample at the initial location or one or more additional locations. The thermal diffusivity of the material may be determined by solving the three dimensional heat (transfer) equation, such as in cylindrical coordinates, using the information in the sensed fluorescent signals.

Determining the thermal property partially based on the fluorescent emissions (e.g., electrical signals corresponding thereto) may include determining a phase delay φ in the pattern of the intensity of fluorescent signals with respect to the corresponding modulated intensity of the infrared light. For example, determining the thermal property partially based on the fluorescent emissions may include determining the phase delay φ in the pattern of the intensity of fluorescent signals with respect to the corresponding modulated intensity of the infrared light, which may include determining the phase of the intensity of fluorescent signals with respect to the phase of the infrared light at the modulation frequency emitted onto the material sample.

Figure 2:
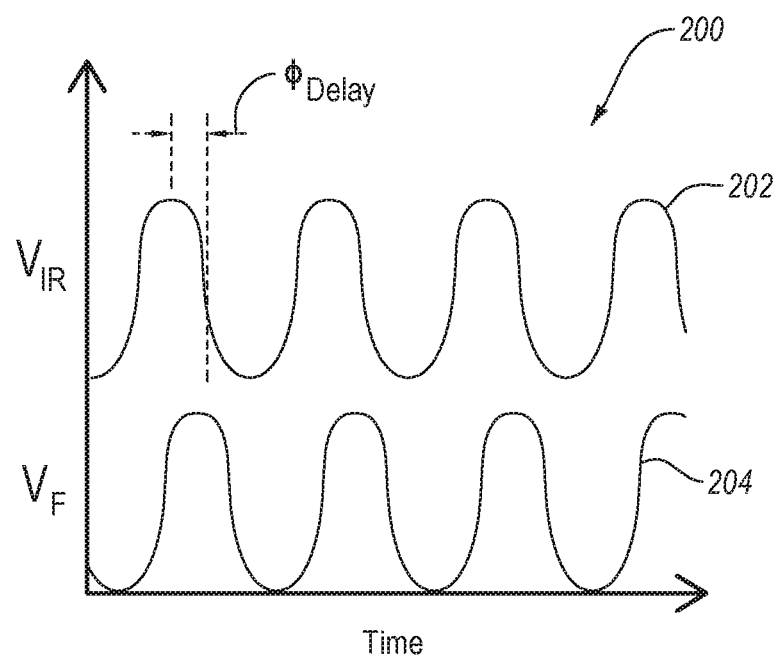
FIG. 2 is a graph of pump light intensity and fluorescent signal intensity versus time, according to an embodiment.

FIG. 2 is a graph 200 of the pump light intensity and fluorescent signal intensity versus time. The voltage intensity of the pump (e.g., infrared) light $V_{IR}$—which is directly correlated to pump light intensity—emitted at the initial modulation frequency 202 is output from the pump light source prior to receiving the fluorescent signals $V_F$ (as voltages) corresponding to the fluorescent emissions received at the photodetector. Accordingly, the fluorescent signals $V_F$ corresponding to the modulated infrared light may show a phase delayed pattern 204 corresponding to the modulation frequency of the infrared light $V_{IR}$. As shown in FIG. 2, the intensities (e.g., signal strength) of the fluorescent signals $V_F$ detected from the fluorescent emissions triggered by the probe light (that is emitted at the fixed intensity) may form a pattern corresponding to the sinusoidal modulation pattern of the modulation frequency of the infrared light $V_{IR}$ emitted onto the material surface. The phase delayed pattern 204 of fluorescent signals detected from the fluorescent emissions may be compared to the initial modulation frequency 202 (e.g., sinusoidal pattern) of the modulated infrared light to determine the phase delay φ therebetween. The phase delay φ can be determined by a peak-to-peak comparison between the maximum amplitude of the sinusoidal peak heights of the initial modulation frequency 202 and the phase delayed pattern 204.

Figure 3:
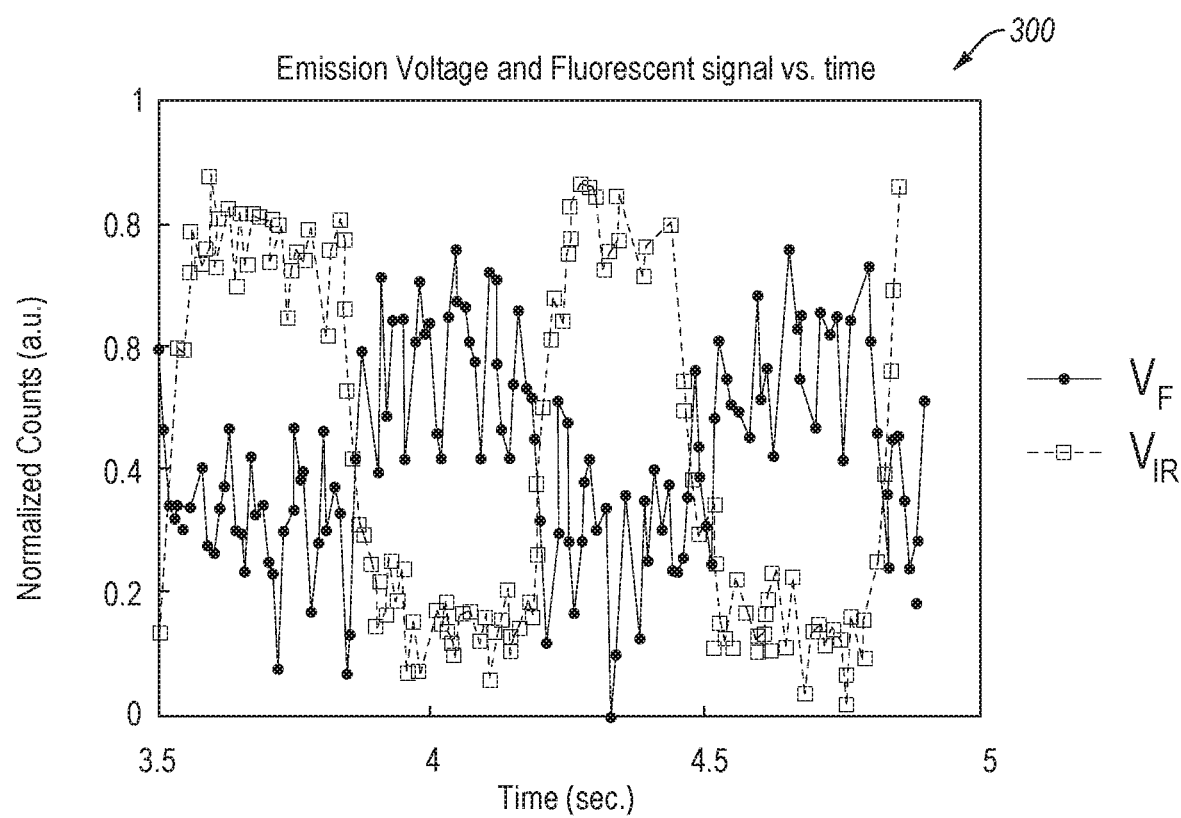
FIG. 3 is a graph of the voltage intensity of infrared light and corresponding voltage intensity of the fluorescent signals versus time, according to an embodiment.

In practice, the graphs of received fluorescent signals and modulation frequency of the infrared light may be much noisier than the initial modulation frequency 202 and phase delayed pattern 204 shown in FIG. 2. FIG. 3 is a graph 300 of the voltage intensity of infrared light $V_{IR}$ and corresponding voltage intensity of the fluorescent signals $V_F$ (detected from the fluorescent emissions triggered by the probe light) versus time. As shown, the modulation frequency of the infrared light $V_{IR}$ and intensity of the fluorescent signals $V_F$ (e.g., voltage corresponding thereto) may each follow a general sinusoidal pattern, but do so in a randomly distributed plurality of points generally tracking the initial modulation frequency 202 and the phase delayed pattern 204, respectively. In order to improve the signal-to-noise ratio of the voltage intensity of the infrared light $V_{IR}$ and corresponding pattern of the voltage intensity of the fluorescent signals $V_F$ and to only get the parts of the signal that occur at the modulation frequency of the infrared light, a phase-sensitive lock-in technique may be used. The phase sensitive lock-in technique may isolate only those portions in the pattern of received fluorescent signals that correspond to the modulation frequency of the infrared light (e.g., voltage used to produce the infrared light from the pump light source).

Figure 4A:
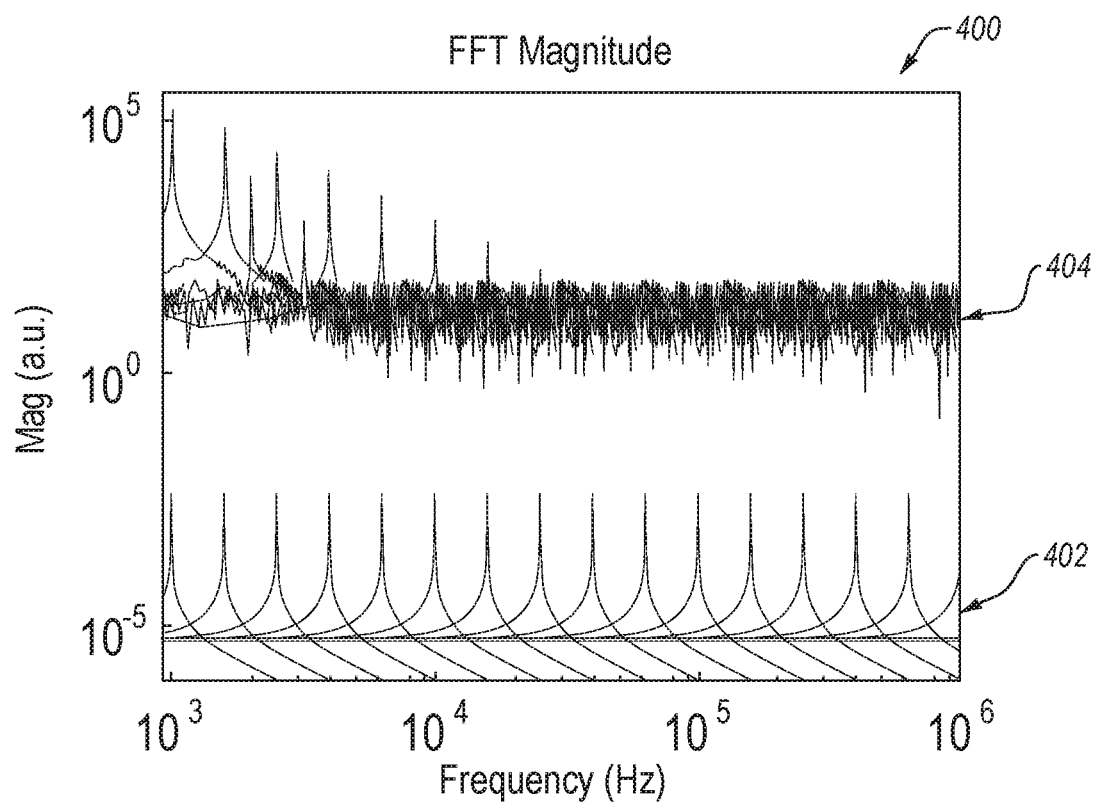
FIG. 4A is a graph of the fast Fourier transform ("FFT") magnitude of the voltage intensity of the infrared light and the voltage intensity of the fluorescent signals versus frequency, according to an embodiment.

The phase sensitive lock-in technique may be carried out via software or hardware. In software applications, a phase sensitive lock-in technique may include applying a fast Fourier transform (FFT) to each of the pattern (e.g., modulation frequency) of voltage intensity of the infrared light $V_{IR}$ and corresponding pattern of the voltage intensity of the fluorescent signals $V_F$, independently. The magnitude of the FFT pattern (e.g., modulation frequency) of voltage intensity of the infrared light $V_{IR}$ and the magnitude of the FFT pattern for the voltage intensity of the fluorescent signals $V_F$ may provide confirmation that the modulation frequency of the voltage intensity of the infrared light $V_{IR}$ is tracked by the voltage intensity of the fluorescent signals $V_F$. FIG. 4A is a graph 400 of the FFT magnitude (in arbitrary units, a.u.) of the voltage intensity of the infrared light $V_{IR}$ and the voltage intensity of the fluorescent signals $V_F$ versus frequency, according to an example. The graph 400 shows the FFT pattern of the voltage intensity of the fluorescent signals $V_F$ 404 and the FFT pattern of the voltage intensity of the infrared light $V_{IR}$ 402. The graph 400 shows that the magnitude of peaks in the FFT pattern of the voltage intensity of the fluorescent signals $V_F$ 404 corresponds (or does not correspond in some cases) to the magnitude of the peaks FFT pattern of the voltage intensity of the infrared light $V_{IR}$ 402 (e.g., corresponding modulation frequency). Accordingly, the software can confirm that the FFT of the voltage intensity of the infrared light $V_{IR}$ is predicting the correct modulation frequency corresponding to the pattern of the voltage intensity of the fluorescent signals $V_F$.

Figure 4B:
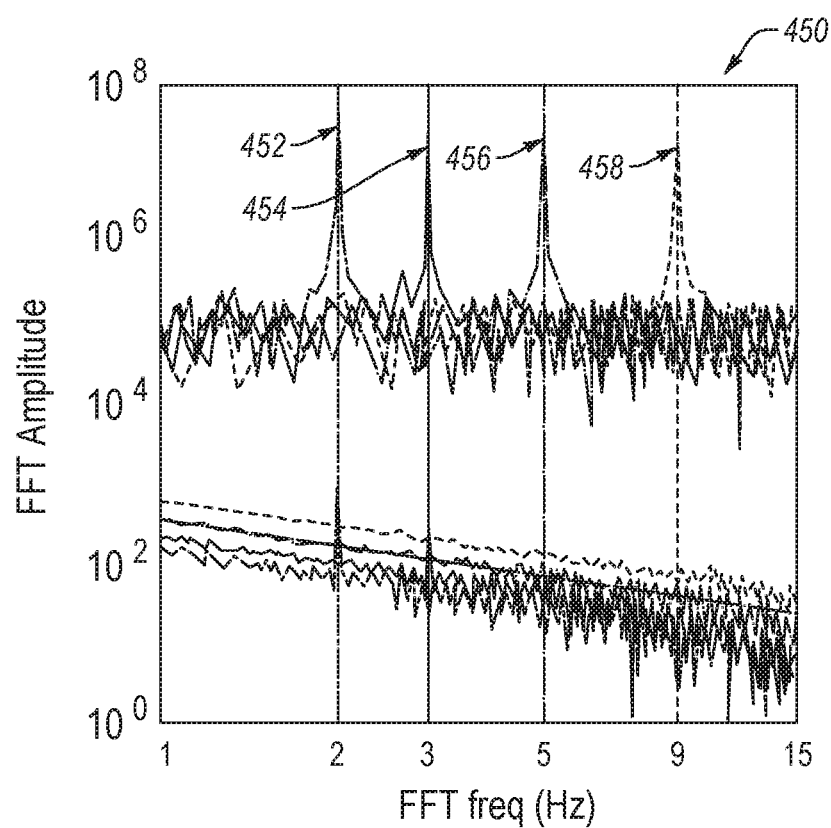
FIG. 4B is a graph of the FFT amplitude of the voltage intensity of the infrared light and the FFT frequency of the voltage intensity of the fluorescent signals, according to an embodiment.

FIG. 4B is a graph 450 of the FFT amplitude of the voltage intensity of the infrared light $V_{IR}$ and the FFT frequency (Hz) of the voltage intensity of the fluorescent signals $V_F$, according to an example. As shown, the FFT amplitude of the voltage intensity of the infrared light may exhibit maximums at one or more points 452, 545, 456, and 458. For example, the FFT amplitude of a first selected modulation frequency of infrared light may have a maximum at point 452 corresponding to the FFT frequency of 2.1 Hz, the FFT amplitude of a second selected modulation frequency of infrared light may have a maximum at point 454 corresponding to the FFT frequency of 3.1 Hz, the FFT amplitude of a third selected modulation frequency of infrared light may have a maximum at point 456 corresponding to the FFT frequency of 5.1 Hz, and the FFT amplitude of a fourth selected modulation frequency of infrared light may have a maximum at point 454 corresponding to the FFT frequency of 9.1 Hz. The maximum amplitudes and the corresponding frequencies may be recorded and used to calculate the thermal diffusivity. For example, the maximum amplitudes may be used to confirm the modulation frequency of the IR light. Then, using the observed modulation frequency, the amplitude of the fluorescent light at that frequency may be taken to be the amplitude of the thermal wave through the material sample. The phase of the fluorescent light at the modulation frequency may be subtracted from the phase of the infrared light at the modulation frequency and that phase delay is taken to be the phase delay of the thermal wave (FIG. 2). The measured phase delay and amplitude of the thermal wave may be fit to the expected phase delay and amplitude of a thermal wave in a material with a certain thermal conductivity (k) and diffusivity (α) at a range of modulation frequencies, such as by a chi-squared analysis as described in more detail below.

Figure 5:
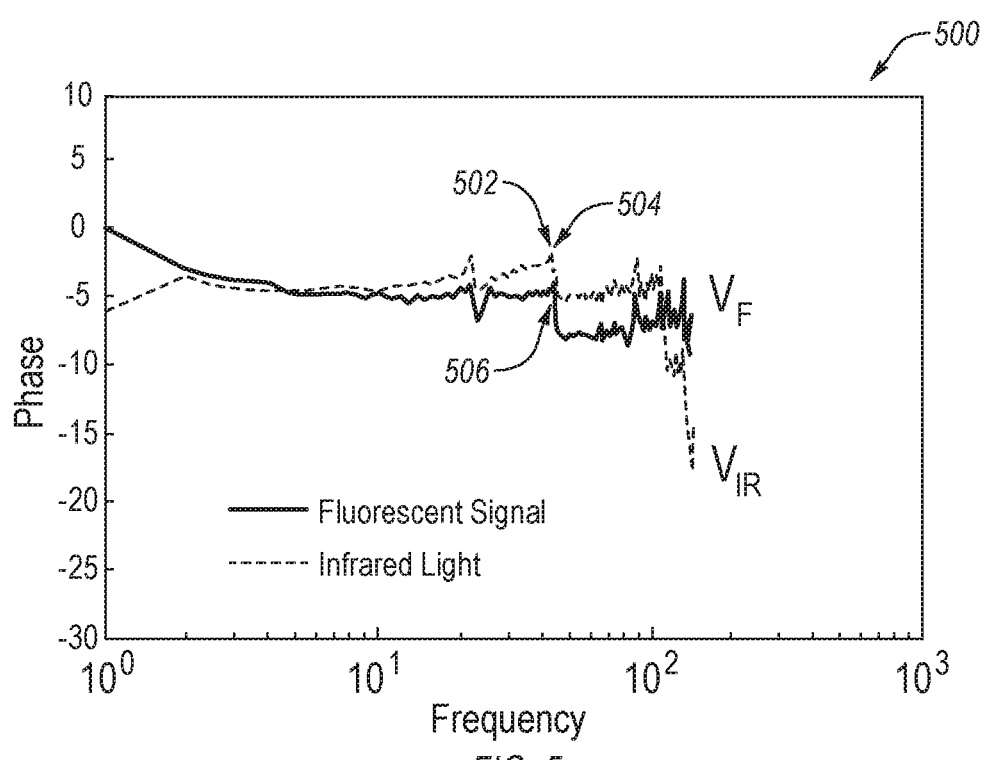
FIG. 5 is a graph of the phases of the FFT pattern of the voltage intensity of the fluorescent signals and the FFT pattern of the voltage intensity of the infrared light, versus the frequencies determined by the FFT, according to an embodiment.

Once the frequencies of each of the FFT pattern of the voltage intensity of the fluorescent signals $V_F$ 404 and the FFT pattern of the voltage intensity of the infrared light $V_{IR}$ 402 are confirmed to correspond to one another, the software can determine the phase delay φ. The phase delay φ (delay of the thermal response due to heating by the pump light) can be determined by subtracting the phase of the fluorescent signal $φ_F$ from the phase of the reference signal $φ_{IR}$. FIG. 5 is a graph 500 of the phases of the FFT pattern of the voltage intensity of the fluorescent signals and the FFT pattern of the voltage intensity of the infrared light, versus the frequencies determined by the FFT. As shown, the FFT pattern of the voltage intensity of the fluorescent signals and the FFT of the voltage intensity of the infrared light each exhibit a characteristic peak 504 and 506 at the modulation frequency (e.g., initial modulation frequency) of the infrared radiation and the phase delayed pattern of the fluorescent signals corresponding thereto. The value of the phase ($φ_F$) of the FFT pattern of the voltage intensity of the fluorescent signals at peak 506 may be subtracted from value of the phase ($φ_{IR}$) of the FFT pattern of the voltage intensity of the infrared light at peak 504, both taken at the characteristic peak 502 (at the modulation frequency), to determine the phase delay φ. The software for performing the above noted functions may be stored as machine readable and executable code in a controller, such as in a memory storage medium therein, and may be executed by a processor therein.

The hardware for determining the phase delay φ may include the controller or another computing device containing software for carrying out one or more portions of any of the functions or methods disclosed herein. The hardware for determining the phase delay φ may include a lock-in amplifier. For example, the lock-in amplifier may be a commercial lock-in amplifier such as a model SR850 lock-in amplifier (from Stanford Research Systems of Sunnyvale, Calif.). The lock-in amplifier may be set up to sense a 5 μV signal at the modulation frequency, embedded within a 100 mV signal that contains many frequencies. This may provide a signal-to-noise ratio near 90 dB. In some embodiments, the lock-in amplifier may have a signal to noise ratio of 60 dB and operate between 500 Hz and 100 kHz.

Before passing the detected voltage intensities of the fluorescent signals $V_F$ and the voltage intensities of the infrared light to a data acquisition system (e.g., computer), the detected voltage intensities of the fluorescent signals and the voltage intensities of the infrared light are fed into the lock-in amplifier. The lock-in amplifier multiplies the detected voltage intensities of the fluorescent signals and the voltage intensities of the infrared light as well as the voltage intensities of the fluorescent signals and the voltage intensities of the infrared light delayed by 90 degrees, each which may result in two peaks. The multiplied signal may then be sent through a low pass filter to filter out the noise. The phase delay and amplitude, then at the modulation frequency, is output as an analog signal with a scaling value and offset. The phase delay and amplitude corresponding to the modulation frequency may be saved in the controller or other data acquisition system. Once the amplitude and phase delay are saved, the modulation frequency may be changed and the test may be run again at the new modulation frequency. A series of phase delays and amplitudes each corresponding to one of a plurality of modulation frequencies may be determined using the lock-in amplifier.

The controller (e.g., computer) may plot the phase delays and/or amplitudes as a function of the respective modulation frequencies at which the amplitudes and phase delays were determined. The plots may include one or more curves of the phase delay versus modulation frequency, such as described with respect to FIG. 5. From examining the phase delay φ, the thermal diffusivity can be determined by solving the heat equation at a given set of boundary and geometry conditions at each modulation frequency and varying the thermal diffusivity (α) until the error between the heat equation solution and the measured phase delay φ is reduced to a selected minimum range (e.g., within 5%, 10%, or 20% of the measured phase delay φ).

As noted above, the phase of the fluorescent light at the modulation frequency may be subtracted from the phase of the IR light at the modulation frequency and that phase is taken to be the phase delay of the thermal wave through the material sample. The measured phase delay and amplitude of the thermal wave are then fit to the expected phase delay and amplitude of a thermal wave in the material with a certain thermal conductivity (k) and thermal diffusivity (α) at a range of modulation frequencies. The phase delay φ is the plotted phase, when the plotted phase is the difference of the phase of the pump light (e.g., reference IR light) and the phase of the fluorescent light (e.g., fluorescent signals), minus any additional phase delay contribution from the electronics (e.g., photodetector, wiring, etc.).

In non-homogenous samples, where the thermal diffusivity is different at different locations due to material variations, the amplitude and phase delay of the thermal wave corresponding to the different locations would vary and provide different curves.

In some embodiments, the controller (e.g., data acquisition software and/or hardware) may record both the intensity of infrared light (voltage used to emit the pump light) and corresponding intensity of the fluorescent signals (voltage corresponding to the fluorescent signals detected) for use in determining the phase delay between the modulation in each pattern corresponding thereto.

Returning to FIG. 1, the act 170 of determining the thermal property partially based on the fluorescent emissions may include determining an amplitude of the pattern of fluorescent signals received by the photodetector, wherein the pattern of fluorescent signals corresponds to a phase delay compared to the modulated intensity of the infrared light corresponding thereto. In some embodiments, determining an amplitude of the pattern of fluorescent signals received by the photodetector may include performing a fast Fourier transformation on the plurality (e.g., pattern) of fluorescent signals. The fast Fourier transform may demonstrate the maximum amplitude and at which frequencies of the fast Fourier transformed signals the maximum amplitude takes place.

The FFT amplitude may be used as a confirmation for the determined thermal diffusivity. By fitting to both the phase delay and the normalized amplitude (e.g., all values are divided by the amplitude of the thermal wave at the lowest modulation frequency) the uncertainty of the property value (e.g., thermal diffusivity) can be reduced. The phase delay represents absolute values, which may allow absolute determination of the thermal diffusivity (because each value of thermal diffusivity has a specific phase delay at each modulation frequency). However, the amplitude values are relative to each other, and thus can only be used in fitting to get thermal diffusivity in conjunction with the phase values.

The act 170 of determining the thermal property partially based on the fluorescent emissions may include plotting the amplitude and phase delay of each pattern of fluorescent signals as a function of modulation frequency of the pump light (e.g., infrared laser). The act 170 may include using the plotted amplitudes and phase delays of the patterns of fluorescent signals, as a function of the modulation frequency of the pump light corresponding to the plotted amplitudes and phases, to solve for thermal diffusivity of a portion (e.g., irradiated portion) of the material sample using the heat equation. The plots may be used to make curves to be used to calculate thermal diffusivity as described below.

The act 170 of determining the thermal property partially based on the fluorescent emissions may include determining the thermal diffusivity of the material sample at one or more points thereon by solving the heat equation at each of the one or more points. In some embodiments, solving the three dimensional heat equation may include solving the heat equation in Cartesian or cylindrical coordinates. Solving the heat equation at each of the one or more points may include solving the heat equation using the phase delay φ and normalized amplitude determined from the lock-in procedure, such as any of those disclosed above.

The three dimensional heat equation (in cylindrical coordinates) may be as follows:

$$\frac{\partial^2 T}{\partial r^2} + \frac{1}{r}\frac{\partial T}{\partial r} + \frac{1}{r^2}\frac{\partial^2 T}{\partial \varphi^2} + \frac{\partial^2 T}{\partial z^2} - \frac{1}{\alpha}\frac{\partial T}{\partial t} = 0 \quad \text{Equation 1}$$

where T=Ambient temperature+temperature added on alternating current+temperature added by direct current, t=time, r=radius, z=distance between light source(s) on the surface of material; and φ=the polar angle is determined as described above.

The value T(r, z, φ, t) may be converted to $\check{T}(r, z, \varphi)e^{i\omega t}$, where ω=2πf and f=the modulation frequency. Accordingly, determining the thermal diffusivity (α) of the material sample at one or more points thereon by solving the heat equation at each of the one or more points may include changing (e.g., converting) the heat equation to the corresponding equation below.

$$\frac{\partial^2 \check{T}}{\partial r^2} + \frac{1}{r}\frac{\partial \check{T}}{\partial r} + \frac{1}{r^2}\frac{\partial^2 \check{T}}{\partial \varphi^2} + \frac{\partial^2 \check{T}}{\partial z^2} - q^2 \partial \check{T} = 0 \quad \text{Equation 2}$$

where $q = \sqrt{\frac{i\omega}{\alpha}}$, and α = thermal diffusivity.

By applying a spatial Fourier transformation to equation 2, the dimensions of the heat equation of equation 2 can be reduced to 2. The resulting equation 3 may be as shown below.

$$\frac{\partial^2 t}{\partial r^2} + \frac{1}{r}\frac{\partial t}{\partial r} + \frac{1}{r^2}\frac{\partial^2 t}{\partial \varphi^2} - \delta^2 t = 0 \quad \text{Equation 3}$$

where $\delta = (i\omega/\alpha) + \lambda^2$.

Equation 3 can be solved with separation of variables and with the boundary conditions relating to conduction in the surrounding atmosphere and in the sample as set forth below. The temperature in the material is assumed as the temperature at the surface of the material. At the surface r=q. Equation 3 converts to equation 4 below.

$$\check{T}_s(r, z, \varphi) = \int_{-\infty}^{\infty} e^{i\lambda z} \frac{P_o e^{-\lambda^2 \frac{b^2}{8}}}{4\pi k_s \delta_s} \left[ \frac{\check{Z}_{n=-\theta}^{\infty} \left( \frac{(-i)^n \cos\left(n\frac{\pi}{2}\right)}{\pi(1-n^2)} \right)}{\text{Bessel Function(s)}} \right] d\lambda \quad \text{Equation 4}$$

where P=absorbed laser (e.g., infrared light) power, b=1/e² width of the pump light beam, k=thermal conductivity, and the subscript "s" refers to the surface of the sample.

By simplifying and numerically solving equation 4 assuming no variations in the polar angle (φ) properties, the thermal diffusivity (α) can be determined. Assuming no heat losses and an infinitely small spot size for the pump light, equation 4 can be converted to the equation 5 below for the surface of the cylinder.

$$\check{T}_s(a, z) = \frac{P_o}{2\pi k_o a} \left[ \cos\left(\sqrt{\frac{i\omega}{\alpha}} z\right) + i \sin\left(\sqrt{\frac{i\omega}{\alpha}} z\right) \right] \quad \text{Equation 5}$$

Equation 5 can be used to solve for the thermal diffusivity (α) using both the real and imaginary components of the temperature. The equation for solving for a using the real and imaginary components of the phase delay may be as shown below.

$$\phi = \tan^{-1} \left[ \frac{\frac{P_o}{2\pi k_o a} \text{imaginary}\left[\cos\left(\sqrt{\frac{i\omega}{\alpha}} z\right) + i \sin\left(\sqrt{\frac{i\omega}{\alpha}} z\right)\right]}{\frac{P_o}{2\pi k_o a} \text{real}\left[\cos\left(\sqrt{\frac{i\omega}{\alpha}} z\right) + i \sin\left(\sqrt{\frac{i\omega}{\alpha}} z\right)\right]} \right] \quad \text{Equation 6}$$

Because z (e.g., the distance between the light source(s)) remains constant, varying ω or the value for f (modulation frequency) therein provides φ(ω, α), where ω=2πf.

Using the thermal model of equation 6 with a guess for thermal diffusivity α, the error of the model at the guessed a can be calculated. The error is calculated by a chi-squared goodness-of-fit criterion, where the sum of the squared difference between the experimental data (e.g., observed fluorescent signals and the determined thermal diffusivity corresponding thereto) and curve fit are minimized Tracking the error at different guessed thermal diffusivity values allows the curve fitting process to converge on physical reasonable property values for thermal diffusivity of the material(s) in the sample (e.g., between $10^{-3}$-$10^{-8}$ m²/s). Using a Levenberg-Marquardt non-linear curve-fitting program, the guessed thermal diffusivity α (and other parameters) is varied until the chi-squared value is minimized after multiple iterations. The value of the guessed a with the lowest error to the curve fit is taken as the thermal diffusivity α of the sample near the irradiated location (irradiated by the pump light).

The chi-squared analysis is used to give a base estimate of the uncertainty of the lowest error, curve-fit, thermal diffusivity α value. The chi-squared analysis may demonstrate that the lowest error, curve-fit, thermal diffusivity value a and the corresponding values for the phase delay φ fit the curve within an acceptable level of error (e.g., 10% in either direction). Accordingly, the uncertainty of the thermal diffusivity α can be determined at specific values of the phase delay φ on the Levenberg-Marquardt non-linear curve. The thermal diffusivity α at the minimized error value is taken as the thermal diffusivity of the material sample at the irradiated location of the sample.

The equations above are merely examples and may be different in one or more aspects depending on one or more of the boundary conditions of the sample and the surrounding environment. The form of the heat equation used (e.g., Cartesian or cylindrical) may differ from the examples provided above accordingly.

In some embodiments, determining the thermal property partially based on the fluorescent emissions may include determining the amplitude and phase of each pattern of fluorescent signals as a function of a corresponding modulation frequency of the pump light emitted from the pump light source (e.g., infrared laser). In some embodiments, determining the thermal property partially based on the fluorescent emissions may include using the amplitudes and phases of the patterns of fluorescent signals (as a function of the corresponding modulation frequencies of the pump light source) to make plots (having curves) to solve for thermal diffusivity of the material sample at each of the one or more locations on the material sample, using the heat equation. Determining the amplitude and phase of each pattern may be as described above. Using the amplitudes and phase delays of the patterns of fluorescent signals to solve for thermal diffusivity of the material sample at each of the one or more points may be as described above.

Figure 6:
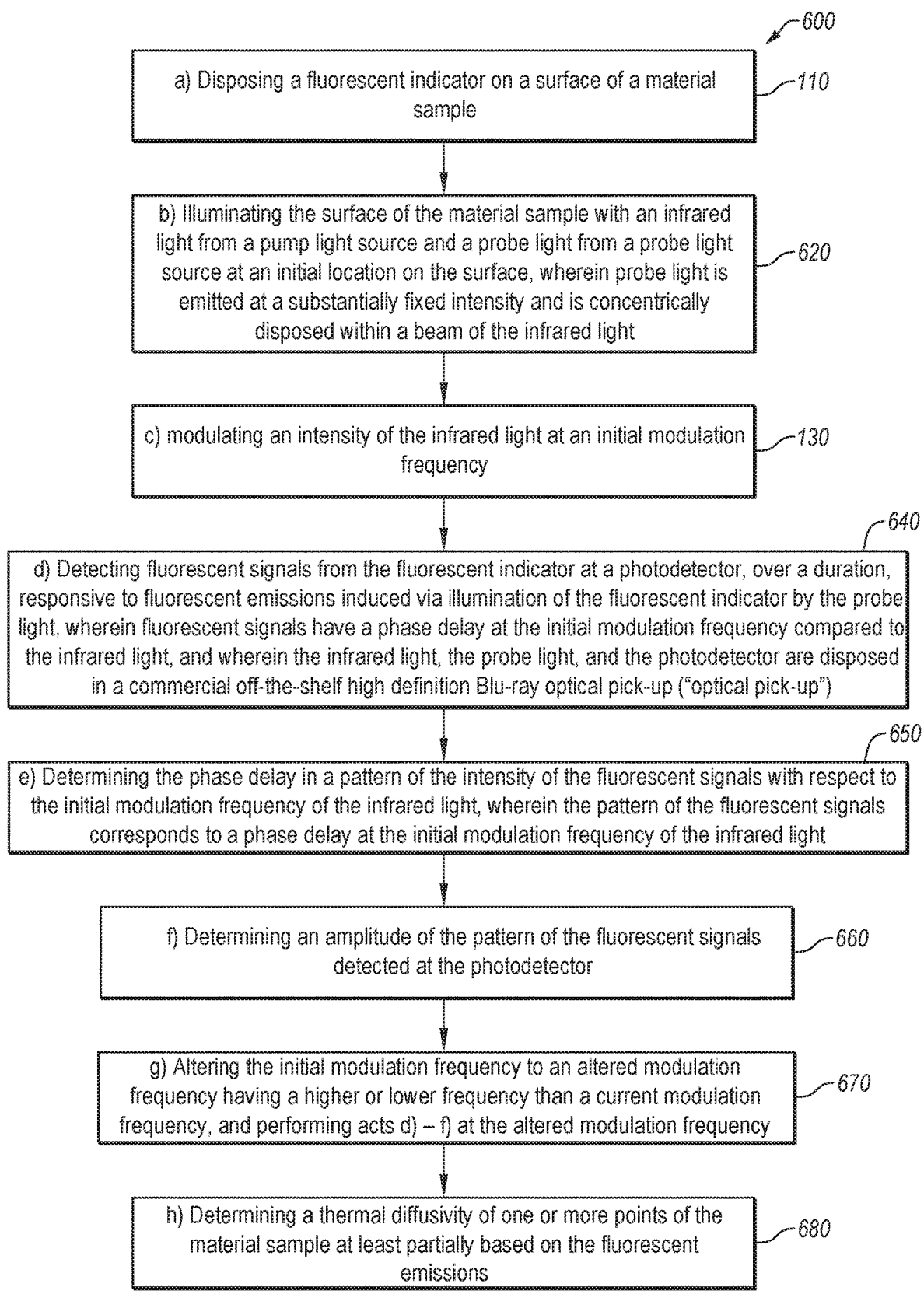
FIG. 6 is a flow chart of a method for determining a material property, according to an embodiment.

FIG. 6 is a flow chart of a method 600 of determining a material property, according to an embodiment. The method 600 includes the act 110 of (a) disposing a fluorescent indicator on a surface of a material sample; an act 620 of (b) illuminating the surface of the material sample with an infrared light from a pump light source and a probe light from a probe light source at an initial location on the surface, wherein probe light is emitted at a substantially fixed intensity and is concentrically disposed within a beam of the infrared light; the act 130 of (c) modulating an intensity of the infrared light at an initial modulation frequency; an act 640 of (d) detecting fluorescent signals from the fluorescent indicator at a photodetector, over a duration, responsive to fluorescent emissions induced via illumination of the fluorescent indicator by the probe light, wherein fluorescent signals have a phase delay from the modulated intensity of the infrared light, and wherein the infrared light, the probe light, and the photodetector are disposed in a commercial off-the-shelf high definition Blu-ray optical pick-up; an act 650 of (e) determining the phase delay in a pattern of the intensity of the fluorescent signals with respect to the modulated intensity of the infrared light, wherein the pattern of fluorescent signals corresponds to a phase delayed frequency of the modulated intensity of the infrared light; an act 660 of (f) determining an amplitude of the pattern of fluorescent signals detected at the photodetector; an act 670 of (g) altering the initial modulation frequency to an altered modulation frequency having a higher or lower frequency than a current modulation frequency, and performing acts (d)-(f) at the altered modulation frequency; and an act 680 of (h) determining the thermal diffusivity of one or more portions of the material sample at least partially based on the fluorescent emissions.

The act 110 of (a) disposing a fluorescent indicator on a surface of a material sample may be as disclosed herein with respect to the method 100. For example, disposing the fluorescent indicator on the surface of the material sample may include disposing a fluorescent dye on the surface of the material sample. In some embodiments, disposing the fluorescent indicator on the surface of the material sample may include disposing quantum dots on the surface of the material sample. The quantum dots may be composed to emit fluorescent light at a selected wavelength.

The act 620 of (b) illuminating the surface of the material sample with an infrared light from a pump light source and a probe light from a probe light source at an initial location on the surface, wherein probe light is emitted at a substantially fixed intensity and is concentrically disposed within a beam of the infrared light may be similar or identical to the act 120 disclosed herein, in one or more aspects. For example, illuminating the surface of the material sample with infrared light from the pump light source at the initial location on the surface may include emitting infrared light onto the surface of the material sample using an infrared laser. Illuminating the surface of the material sample with probe light from the probe light source at the initial location on the surface may include emitting color light onto the surface of the material sample using a color laser. The color laser may emit probe light in a selected color, such as blue, red, etc. The color of the probe light may be selected to cause fluorescent emission in the fluorescent indicator, such as emissions at a selected wavelength.

In some embodiments, the probe light source and the pump light source may be disposed on an optical arrangement, such as an optical pick-up (e.g., commercial off-the-shelf Blu-ray optical pick-up). For example, the optical pick-up (e.g., containing the color laser) may be modified to include the pump light source. The probe light source may be positioned to emit the probe light concentrically within the pump light emitted from the pump light source. In such examples, the probe light may be emitted at a substantially fixed intensity and may be concentrically disposed within a beam of the infrared light.

In some embodiments, illuminating the surface of the material sample with infrared light from the pump light source and probe light from the probe light source at the initial location on the surface may include illuminating the surface of the material sample with the infrared light and the probe light where the spacing between the probe light source and the pump light source is constant.

The act 130 of (c) modulating an intensity of the infrared light at an initial modulation frequency may be performed as described above with respect to the method 100. For example, modulating the intensity of the infrared light at the initial modulation frequency may include initiating a sinusoidal modulation of the infrared radiation emitted from the pump light source, such as with a controller. For example, modulating the intensity of the infrared light at the initial modulation frequency may include modulating the intensity of the infrared beam in a sinusoidal pattern of increasing and decreasing intensities effective to cyclically heat the material sample in the sinusoidal pattern.

The act 640 of (d) detecting fluorescent signals from the fluorescent indicator at the photodetector, over the duration, responsive to fluorescent emissions induced via illumination of the fluorescent indicator by the probe light, wherein fluorescent signals have the phase delay from the modulated intensity of the infrared light, and wherein the infrared light, the probe light, and the photodetector are disposed in the commercial off-the-shelf high definition Blu-ray optical pick-up may be similar or identical to the act 140 disclosed herein, in one or more aspects. For example, the probe light source, the pump light source, and the photodetector may be disposed in the commercial off-the-shelf high definition Blu-ray optical pick-up, such as a Toshiba PHR-803T optical pick-up (available from Toshiba Corp. of Tokyo Japan), or similarly equipped optical pick-ups. The optical pick-up may be modified to include one or more of a selected pump light source and a selected probe light source. The fluorescent signals may be detected at the photodetector, converted to electrical signals thereat, and may be relayed to a controller. The plurality of fluorescent emissions induced via the probe light from the probe light source may exhibit a phase delay corresponding to the frequency of the pump light. The fluorescent intensity of the signals emitted from the fluorescent indicator illuminated on the material sample is directly related to the temperature of the sample in the illuminated area. For example, as the temperature of the material sample increases, the intensity of the fluorescent radiation decreases. Over relatively small variations in temperature (e.g., about 5° C. or less), the change in intensity of the fluorescent emissions is relatively linear.

The act 650 of (e) determining the phase delay in the pattern of the intensity of the fluorescent signals with respect to the modulated intensity of the infrared light, wherein the pattern of fluorescent signals corresponds to a phase delay at the modulated intensity of the infrared light may be as described above with respect to the act 170, in one or more aspects. For example, determining the phase delay in the pattern of the intensity of the fluorescent signals with respect to the modulated intensity of the infrared light may include using the phase sensitive lock-in technique (e.g., with a phase sensitive lock-in amplifier) to reduce the signal-to-noise ratio of the pattern of fluorescent signals received responsive to the infrared light emitted at the modulation frequency, as disclosed herein. For example, the phase sensitive lock-in technique may be carried out via software or hardware as disclosed herein.

In software applications, a phase sensitive lock-in technique may include applying an FFT to each of the pattern of voltage intensity of the infrared light and corresponding pattern of the voltage intensity of the fluorescent signals, independently.

Once the frequencies are locked-in (e.g., each of the FFT pattern of the voltage intensity of the fluorescent signals and the FFT pattern of the voltage intensity of the infrared light are confirmed to correspond to one another at the modulation frequency), the software can determine the phase delay φ, as disclosed herein with respect to the act 170. For example, the software for performing the above noted functions may be stored as machine readable and executable code in a controller, such as in a memory storage medium therein, and may be carried out by a processor therein.

In hardware applications, the phase sensitive lock-in technique may include using a lock-in amplifier. For example, the lock-in amplifier may be a commercial lock-in amplifier such as a model SR850 lock-in amplifier. The hardware for determining the phase delay φ) may include a computing device (e.g., computer) containing software for carrying out one or more portions of any of the functions or methods disclosed herein.

The act 660 of (f) determining an amplitude of the pattern of fluorescent signals detected at the photodetector may be similar or identical to one or more aspects of the act 170 disclosed herein. For example, determining an amplitude of the pattern of fluorescent signals detected at the photodetector may include performing a fast Fourier transformation on the plurality (e.g., pattern) of fluorescent signals. The fast Fourier transform may demonstrate the maximum amplitude and at which frequencies of the fast Fourier transformed signals the maximum amplitude takes place as described above with respect to FIG. 4B. The FFT amplitude may be used as a confirmation for the determined thermal diffusivity as described herein. The amplitude values are relative to each other, and thus can only be used in fitting to get thermal diffusivity in conjunction with the phase values. For the fitting, both the phase and normalized amplitude are calculated based on the guessed thermal diffusivity. Then, the error between those calculations and the experimental data are calculated with the chi-squared process mentioned before. The non-linear curve fitting process then varies the guessed thermal diffusivity until the chi-squared error is reduced to a minimum.

The act 670 of (g) altering the initial modulation frequency to an altered modulation frequency having a higher or lower frequency than a current modulation frequency, and performing (d)-(f) at the altered modulation frequency may be similar or identical to the acts 150 and 160, in one or more aspects. For example, the altering the initial modulation frequency to an altered modulation frequency having a higher or lower frequency than a current modulation frequency may include increasing or decreasing the frequency of the modulation of the infrared light (e.g., voltage provided to the pump light source) form the initial modulation frequency. The initial modulation frequency may be any of the modulation frequencies disclosed herein. In some embodiments, altering the initial modulation frequency of the infrared light to an altered modulation frequency may include altering the modulation frequency of the infrared light being emitted onto the material sample by an amount that renders the signals detected at the altered modulation frequency discernable from the initial modulation frequency. Altering the initial modulation frequency of the infrared light to the altered modulation frequency may include increasing or decreasing the frequency of infrared light from the initial frequency by a selected amount, such as 500 Hz, 600, Hz, 700 Hz, 1 kHz, 2 kHz, 3 kHz, 5 kHz, or 10 kHz.

In some embodiments, altering the initial modulation frequency of the infrared light to the altered modulation frequency may include modulating the intensity of the infrared beam in a sinusoidal pattern of increasing and decreasing intensities. Modulating the intensity of the infrared light at the altered modulation frequency may be effective to modulate the temperature of the material sample by 5° C. or less (e.g., 5° C., 4° C., 3° C., 2° C., or 1° C.). The modulation of the temperature at the altered modulation frequency may be the same (e.g., same magnitude of change) as the modulation of the temperature at the initial modulation frequency.

Performing acts (d)-(f) at the altered modulation frequency may include detecting fluorescent signals from the fluorescent indicator at a photodetector, over a duration, responsive to fluorescent emissions induced via illumination of the fluorescent indicator by the probe light, wherein fluorescent signals have a phase delay from the modulated intensity of the infrared light, and wherein the infrared light, the probe light, optical filter, and the photodetector are disposed in a commercial off-the-shelf high definition Blu-ray optical pick-up; determining the phase delay in the pattern of the intensity of the fluorescent signals with respect to the modulated intensity of the infrared light (e.g., altered modulation frequency), wherein the pattern of fluorescent signals corresponds to a phase delayed at the modulation frequency of the modulated intensity of the infrared light; and determining an amplitude of the pattern of fluorescent signals detected at the photodetector; all at the altered modulation frequency. In some embodiments, performing (d)-(f) at the altered modulation frequency may be similar or identical to the act 160, in one or more aspects. Each of (d)-(f) may be similar or identical to the acts 640-660, respectively, as disclosed herein.

The act 680 of (h) determining the thermal diffusivity of one or more portions of the material sample at least partially based on the fluorescent emissions may be similar or identical to the act 170 in one or more aspects. For example, determining the thermal property partially based on the fluorescent emissions may include determining the thermal diffusivity of the material sample at the initial location and one or more additional locations. The thermal diffusivity of the material may be determined by solving the three dimensional heat (transfer) equation, such as in cylindrical coordinates, using the information in the sensed fluorescent signals (e.g., phase delay and amplitude), as disclosed herein with respect to the method 100. For example, the amplitudes and phase delays may be plotted as a function of the respective modulation frequencies to make curves to calculate the thermal diffusivity as disclosed above with respect to the act 170. In some embodiments, determining the thermal diffusivity of one or more portions of the material sample at least partially based on the fluorescent emissions may include using the three dimensional heat equation to solve for the thermal diffusivity, such as disclosed herein with respect to equations 1-6. Determining the thermal diffusivity of one or more portions of the material sample at least partially based on the fluorescent emissions may include using a curve-fitting program (e.g., Levenberg- Marquardt non-linear curve-fitting program) to fit a value of thermal diffusivity α that produces the lowest chi-squared value (e.g., error), as disclosed herein. The value of the thermal diffusivity α with the lowest error is taken as the thermal diffusivity α of the material (e.g., the determined thermal diffusivity of the material) at the location that is irradiated, as disclosed herein. Determining the thermal diffusivity of one or more portions of the material sample at least partially based on the fluorescent emissions may include performing a Chi-squared analysis to give the base estimate of the uncertainty of the value of the determined thermal diffusivity α, as disclosed herein.

In some embodiments, determining the thermal diffusivity of one or more portions of the material sample at least partially based on the fluorescent emissions may include determining the amplitude and phase delay of each pattern of fluorescent signals as a function of a corresponding modulation frequency of the infrared light, and using the amplitude and phase of the pattern of fluorescent signals, as a function of the corresponding modulation frequencies of the infrared light, to solve for thermal diffusivity of the material sample at each of the one or more points using the heat equation.

The method 600 may include moving the pump light source, probe light source, and detector (e.g., the optical pick-up) or a target region of each of the same to at least one additional location on the surface, repeating acts (b)-(h), and determining if the thermal diffusivity at the initial location and the at least one additional location is different. Moving the optical arrangement may include moving the optical pick-up with respect to the material sample, such as by physically moving the material sample or the optical pick-up with respect to the other. In some embodiments, moving the optical pick-up with respect to the material sample may include moving the material sample using any of the systems disclosed herein, such as with one or more of controllers and actuators. In some embodiments, moving the optical pick-up to at least one additional location on the surface may include moving the optical pick-up to at least one additional location on the surface with a positional tolerance of 1 μm or less (e.g., less than 0.5 μm or less than 0.3 μm). In some embodiments, moving the optical pick-up to at least one additional location on the surface may include maintaining a constant distance between the optical pick-up and the material sample at the initial location and the at least one additional location. The thermal diffusivity can be determined at the initial location and at the at least one additional location as disclosed herein.

In some embodiments, determining if the thermal diffusivity is different at the initial location and the at least one additional location can be carried out by a controller, such as by directly comparing the determined values for the thermal diffusivity of the respective locations. Differing values may indicate different materials at the respective locations. In applications where the material is supposed to be consistent throughout, the comparison may be able to detect inconsistencies in the material, such as due to poor manufacturing or degradation during use. For example, a difference in thermal diffusivities may indicating that a Zircaloy® cladding of a nuclear fuel has been degraded by detecting differences in thermal diffusivity indicative of the presence of a degradation product thereof, such as zirconia hydride. In such examples, a higher thermal diffusivities than several other determined thermal diffusivities may indicate that a region may have zirconia hydride therein.

In some embodiments, the method 600 may include plotting the determined thermal diffusivities of the sample as a function of position of the irradiated areas of the material sample corresponding to the thermal diffusivities, such as to indicate a location of the differing materials or degradation in the sample.

In some embodiments, the method 600 may include correlating the thermal diffusivity of the material at the initial location and the at least one additional location with a reference thermal diffusivity of one or more known materials to determine a species of the material at the initial location and the at least one additional location. Such correlation can be carried out with a controller, such as by utilizing one or more look-up tables stored in a memory thereof.

In some embodiments, one or more of the acts of the method 100 or 600 may be combined, omitted, or performed in a different order than presented herein.

In some embodiments, one or more of the method 100 or 600 may include preparing the material sample, such as placing the material sample on a working bed (e.g., table) of a system for determining the thermal diffusivity of the material sample.

Figure 7A:
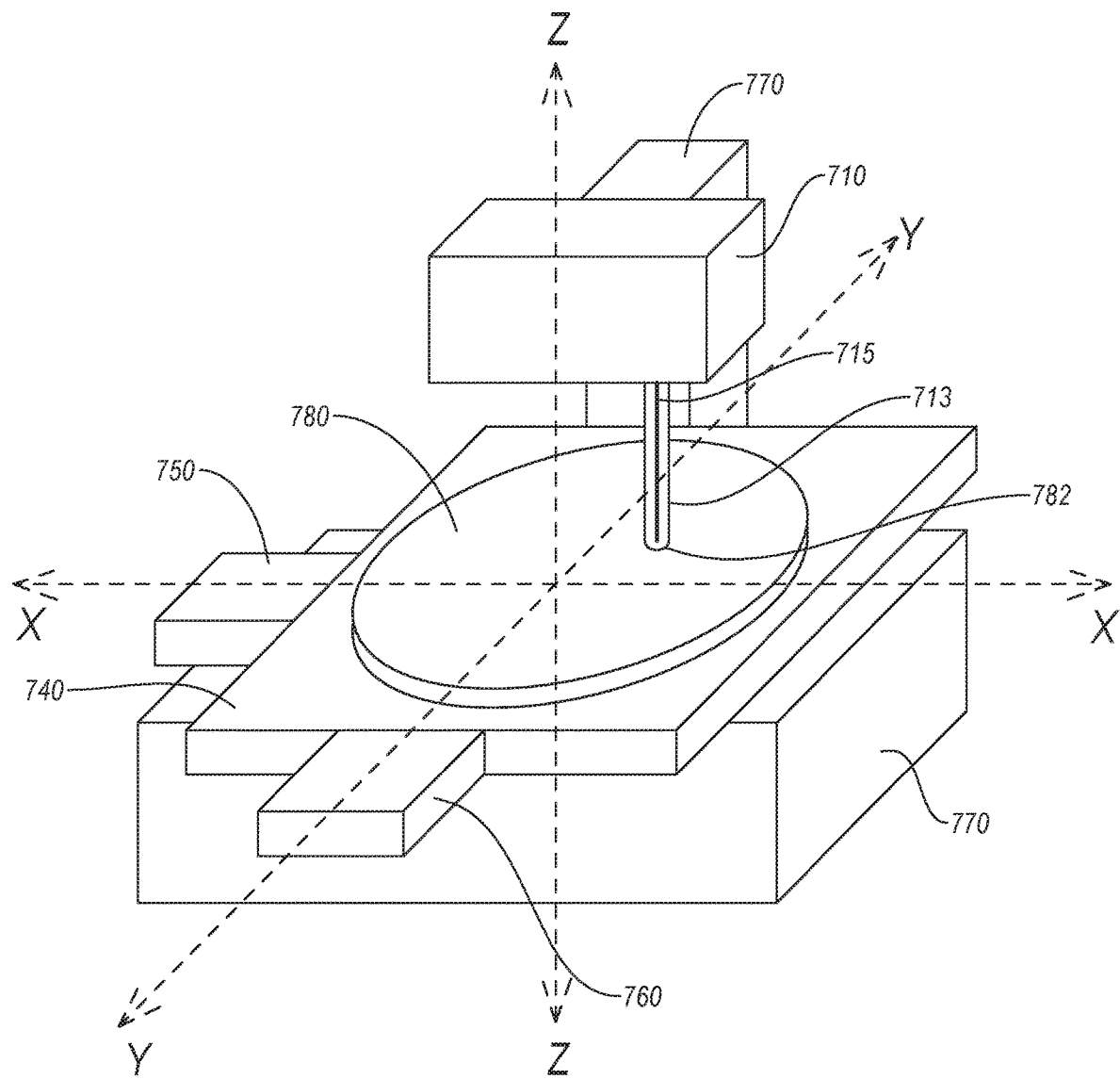
FIG. 7A is a schematic of a system for determining a thermal diffusivity of a material sample, according to an embodiment
Figure 7B:
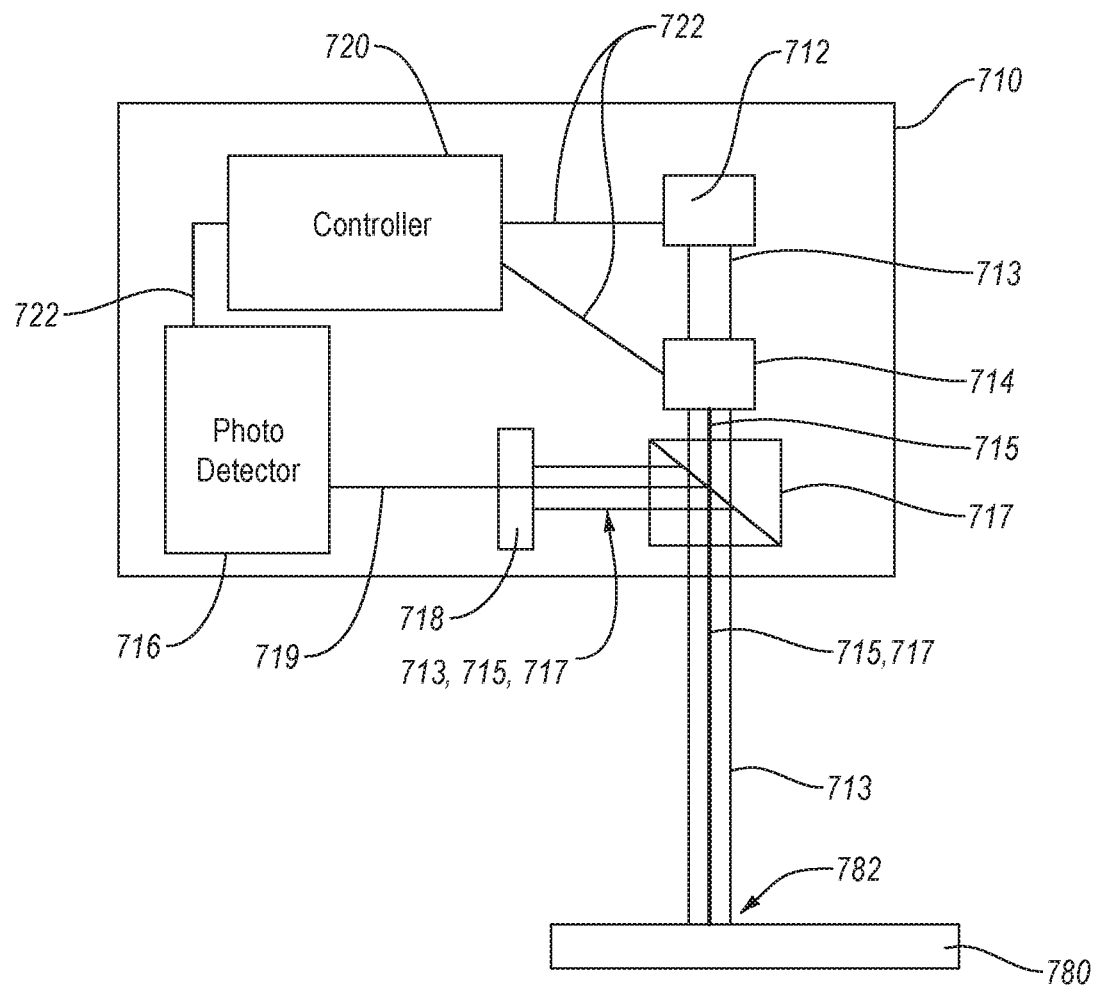
FIG. 7B is a schematic of the optical arrangement, according to an embodiment

FIG. 7A is a schematic of a system 700 for determining a thermal diffusivity of a material sample, according to an embodiment. The system 700 includes an optical arrangement 710, a table 740 or other suitable support, one or more actuators 750 and 760, at least one controller (not shown), and a frame 770. The material sample 780 may be disposed on the table 740, such as below the optical arrangement 740. FIG. 7B is a schematic of the optical arrangement 710, according to an embodiment. The optical arrangement 710 may include a pump light source 712, a probe light source 714, and a photodetector 716. The optical arrangement 710 may include a beam splitter 717 and a filter 718. The optical arrangement 710 may include a controller 720. The controller 720 may be operably coupled to any components of the system 700 via one or more connections 722 (e.g., hardwired or wireless connections) to control the components. For example, the controller 720 can be operably coupled to one or more of the pump light source 712, the probe light source 714, the photodetector 716, and one or more actuators 750 or 760.

In some embodiments, the optical arrangement 710 may include as a commercial off-the-shelf optical pick-up, such as a Toshiba PHR-803T optical pick-up or the like. In such embodiments, the commercial off-the-shelf optical pick-up may include the probe light source 714 (e.g., color laser) and the photodetector 716, and may be altered, such as to include the pump light source 712 (e.g., infrared laser).

The pump light source 712 may emit pump light 713 at a selected wavelength, intensity, or frequency of modulation of any of the foregoing. The pump light source 712 may include an infrared laser. The pump light source 712 may emit pump light 713 (e.g., infrared light) at a plurality of intensities, such as in a selected pattern (e.g., modulation frequency) of intensities. For example, the pump light source 712 may emit pump light 713 in a sinusoidal pattern of intensities at a selected modulation frequency. The pump light 713 and the selected pattern of intensities may be selected to cyclically heat the material sample 780 in the irradiated region 782 within a selected temperature range. For example, the pump light 713 and the selected pattern of intensities may be selected to cyclically heat the material by 5° C. or less (e.g., in a sinusoidal pattern of heating). The controller 720 may direct a power source (not shown) to supply voltage to the pump light source 712 in a selected pattern of intensity. For example, the controller 720 may direct the delivery of current to the pump light source effective to cause the pump light source to emit pump light in any of the selected wavelengths, patterns (e.g., modulation frequencies of intensity), or durations disclosed herein.

The probe light source 714 may emit probe light 715 of a selected wavelength or intensity. The probe light source 714 may include a color laser. The color laser may be a green, red, or blue laser. The probe light source 714 may provide probe light 715 of a constant wavelength and at a low enough intensity to prevent heating the material sample to a level that interferes with the methods disclosed herein. The probe light source 714 may provide probe light 715 at a wavelength selected to not interfere or overlap in wavelength with the fluoresced light from the indicator material on the material sample 780. The controller 720 may direct a power source (not shown) to supply the current and voltage to the probe light source 714 in a selected wavelength and intensity. For example, the controller 720 may direct the delivery of current to the probe light source 714 effective to cause the probe light source 714 to emit probe light in any selected wavelengths of colored light.

The pump light source 712 may be positioned with respect to the probe light source 714 such that the probe light 715 is concentrically disposed within the pump light 713. For example, the pump light source 712 may be positioned with respect to the probe light source 714 such that the probe light 715 is concentrically disposed within the pump light 713 throughout a beam length of one or both of the probe light or the pump light (e.g., concentric beams as shown in FIGS. 7A and 7B). The pump light source 712 may emit pump light in a beam of a greater diameter than the probe light 715 from the probe light source 714. In some embodiments, the beam width (e.g., spot size) of the probe light 715 may be less than 50% (e.g., less than 20%) of the beam width of the pump light 713. In some embodiments, the pump light source 712 may be positioned with respect to the probe light source 714 such that the probe light 715 is concentrically disposed within the pump light 713 at the point where the probe light 715 and pump light 713 irradiate the surface of the material sample 780 (e.g., converging beams) at the irradiated region 782.

Responsive to irradiation with the probe light 715, the fluorescent indicator may emit fluorescent signals 719 (e.g., fluorescent light). The optical arrangement 710 may include the beam splitter 717. The beam splitter 717 may be positioned and configured to direct the returning probe light 715, pump light 713, and fluorescent signals 719 from the material sample toward the photodetector 716. The optical arrangement 710 may include the one or more filters 718 selected to filter one or more wavelengths of light (e.g., the pump light 713 and the probe light 715) from the light returning to photodetector 716 of the optical arrangement 710. For example, the one or more filters 718 may be configured to filter out every wavelength of light except the wavelength(s) of the fluorescent signals 719. Accordingly, any reflected probe light 715 and pump light 713 may be filtered from the light (fluorescent signal) returning to the optical arrangement 710. In some embodiments, the one or more filters 718 may be disposed between the beam splitter 717 and photodetector 716.

The photodetector 716 may be operably coupled to the controller 720 and may relay voltages corresponding to the detected fluorescent signals to the controller 720. In some embodiments, the photodetector 716 may include one or more of photodiodes, phototransistors, charge coupled devices, or any other light detector suitable of detecting the fluorescent signals. The intensity of the fluorescent signal may be communicated to the controller (e.g., data acquisition device) by the photodetector as a voltage. The magnitude (e.g., intensity) of the voltage from the photodetector 716 for the fluorescent signals received thereon may be directly correlated to the intensity of the fluorescent signals 719.

The table 740 may be sized and positioned to hold the material sample 780 in a position where the optical arrangement 710 may emit light onto the surface of the material sample. The table 740 may be movable on one or more axes. For example, the table 740 may be movable in one or more of the x or y axes. In some embodiments, the table 740 may be rotatable, such as rotatable about a center point. For example, the table 740 may be rotatable about the z axis. The table 740 may include fixturing for retaining the material sample 780. For example, the fixturing may include a vice, a magnet, or any other device for holding a material to the table 740.

The table 740 may be operably coupled to a frame 770 or structure. The frame 770 may include mounts or features for holding the table 740 and the optical arrangement 710 in positions for allowing the light (e.g., pump light and probe light) to be emitted on the material sample 780 on the table 740. For example, the frame 770 may include a base for holding the table 740 and an arbor or gantry for holding the optical arrangement 710. The arbor or gantry may suspend the optical arrangement 710 over the table 740 to allow the optical arrangement 710 to be positioned to emit light (e.g., pump light and probe light) onto the material sample 780 on the table 740. The system 700 may include one or more actuators 750 and 760 operably coupled to the frame 770 or table 740. Each of the one or more actuators 750 or 760 may include one or more of a motor (e.g., servo-motor, stepper motor, etc.), a slide, arms, a gantry, an arbor, a head, ball screw(s), a spindle, or ways for moving one or more of the optical arrangement 710 and table 740 with respect to each other. For example, ball screws may be operably coupled to the frame 770 and the table 740 to move the table 740 on the frame. The one or more actuators may include an x-axis motor (at 750), a y-axis motor (at 760), and a z-axis motor (not shown). Each motor may control movement of the table along the respective axis. In some embodiments (not shown), the table 740 may be mounted to a spindle or rotary element configured to rotate the table 740 about a central axis. In such examples, the one or more actuators may include the spindle to rotate the table 740 and at least one motor to move the optical arrangement 710 radially with respect to the table 740. The controller 720 may be operably coupled to the one or more actuators 750 or 760 (e.g., motors) to direct movement of the optical arrangement with respect to the table 740 (e.g., material sample thereon). The one or more actuators 750 or 760 may move the optical arrangement 710 with respect to the table 740 at a positional tolerance (e.g., tolerance of movement) below about 1 µm, such as less than about 0.5 µm or less than 0.3 µm.

In some embodiments, one or more first actuators 750 may be positioned and operably coupled to the table 740 and controller 720 to move one or more of the optical arrangement and the table with respect to the other. In some embodiments, one or more second actuators 760 may be positioned and operably coupled to the table 740 and controller 720 to move one or more of the optical arrangement 710 or table 740 with respect to the other. In some embodiments, one or more actuators for moving the optical arrangement 710 vertically with respect to the table 740 may be operably coupled to the frame 770 and/or table 740 and the controller 720. The controller 720 may control the distance between the optical arrangement 710 and the material sample 780 on the table 740.

In some embodiments, the system 700 may include a power source (not shown) operably coupled any of the components of the system 700. In some embodiments, the power source may be controlled by the controller 720. For example, the controller 720 may control the amount of current and/or voltage delivered to the pump light source and the probe light source, to deliver the pump light and probe light as disclosed herein.

The controller 720 may be operably coupled to the one or more actuators 750 and 760 and may activate the one or more first and second actuators 750, 760 to move one or more of the optical arrangement 710 or the table 740 with respect to each other.

The controller 720 may be operably coupled to the probe light source 714 in the optical arrangement 710 and may direct the probe light source 714 to emit the probe light 715 such as at any of the wavelengths or intensities disclosed herein. The controller 720 may be operably coupled to the pump light source 712 and may direct the pump light source 712 to emit the pump light 713 (e.g., infrared light) and modulate an intensity of the pump light 713 according to a selected frequency (e.g., modulation frequency). The controller 720 may be operably coupled to the photodetector 716 (e.g., photodiode(s)) and may receive signals (e.g., voltage) from the photodetector 716 corresponding to fluorescent signals 719 detected at the photodetector 716. The controller 720 may automatically determine a thermal diffusivity of the material sample 780 at one or more locations thereon using the received signals (e.g., voltage) corresponding to the detected fluorescent signals 719.

The controller 720 may automatically determine the thermal characteristic (e.g., thermal diffusivity) of the material sample at one or more locations thereon. For example, the controller 720 may include operational programs to carry out portions of any of the methods disclosed herein. The controller 720 may determine the phase delay in the pattern of the intensity of the received signals (e.g., fluorescent signal modulation frequency) with respect to a modulation frequency of the intensity of the infrared light, wherein the pattern of received signals (e.g., voltages related from the photodetector) corresponds to the fluorescent signals detected at the modulation frequency of the intensity of the infrared light. The controller 720 may determine the amplitude of the pattern of the received signals (e.g., voltages related from the photodetector) corresponding to the fluorescent signals, wherein the pattern corresponds to a phase delayed frequency at the modulation frequency. The controller 720 may alter the frequency of modulation of the intensity of the infrared light to a higher or lower frequency than a current modulation frequency (e.g., initial modulation frequency), to emit infrared light at an altered modulation frequency, such as by controlling the power source to deliver a selected amount of current and/or voltage to the pump light source (e.g., infrared light). The controller 720 may determine the phase delay and amplitude of the pattern of the voltages at the altered modulation frequency, as disclosed herein. The controller 720 may (e.g., numerically) solve for the thermal diffusivity of the material sample at one or more locations thereon using the heat equation, as disclosed herein. For example, the controller 720 may plot the amplitude and phase of each pattern of received fluorescent signals (e.g., as voltages) as a function of the frequency of modulation of the infrared light corresponding thereto, and may use the plotted amplitudes and phase delays of the patterns of received signals to solve for thermal diffusivity of the material sample at the one or more locations using the heat equation, as disclosed herein. The controller 720 may automatically carry out any portions of any of the methods disclosed herein responsive to activation or input by a user.

In some embodiments, the controller 720 may direct and carryout measurements at multiple sights on a material sample, such as to determine the homogeneity of the material sample (e.g., at least infer the presence of degradation products or material inconsistencies). For example, the controller 720 may direct the one or more first and second actuators to move one or more of the optical arrangement or the table, with respect to each other, from an initial location at which an initial interrogation takes place to at least one additional location that is different than the initial location. The controller 720 may direct the probe light source to emit the probe light at the initial location and the at least one additional location. The controller 720 may direct the pump light source to emit the infrared light at the initial location and the at least one additional location, and modulate the intensity of the infrared light according to a selected frequency or one or more altered frequencies (e.g., modulation frequencies). The controller 720 may receive signals (e.g., voltage) from the photodetector corresponding to fluorescent signals detected at the photodetector. The controller 720 may determine a thermal diffusivity of the material sample at the initial location and the at least one additional location thereon using the received voltages corresponding to the detected fluorescent radiation, as disclosed herein. For example, the controller 720 may solve for thermal diffusivity of the material sample at the initial location and the at least one additional location using the heat equation and plotted amplitudes and phase delays of the patterns of received voltages corresponding to fluorescent signals captured at selected modulation frequencies, as a function of the frequency of the infrared laser beam corresponding to the plotted amplitudes and frequencies at the initial location and the at least one additional location.

In some embodiments, the controller 720 may automatically compare the thermal diffusivities of the material sample at the initial location and the at least an additional location to determine if the material sample has a different composition at the initial location than at the at least one additional location. For example, the controller 720 may compare the determined thermal diffusivity value of the initial location to the determined thermal diffusivity value of the at least one additional location to determine a match or mismatch therebetween. The controller 720 may output an indication of a match or mismatch of the determined thermal diffusivities such as via a user interface.

In some embodiments, the controller 720 may automatically compare the determined thermal diffusivity of the material sample at one or more of the initial location and the at least an additional location to one or more reference thermal diffusivities of known materials to determine if a specific known material is present in the material sample. For example, the controller 720 may have a look-up table of known thermal diffusivity values for material species stored thereon and may perform a comparison of the determined thermal diffusivity value(s) against the look-up table to determine if any of the materials in the look-up table may be present.

The controller 720 may be programmed and equipped to direct, control, or carry out any of the methods or aspects thereof disclosed herein. In some embodiments, one or more portions of the controller 720 may be at least partially embedded within or on the optical arrangement 710 as shown in FIG. 7B. In some embodiments, one or more portions of the controller 720 may be disposed outside of the optical arrangement 710, such as in one or more separate computing devices, remote from the optical arrangement 710.

In some embodiments, the system may include an optical pick-up (e.g., Toshiba PHR-803T) including an infrared laser (incorporated to the optical pickup), a color laser, and a photodetector, wherein the color laser is positioned to emit a colored light beam at a fixed intensity that is concentrically disposed within an infrared light beam from the infrared laser; the table for mounting material samples; one or more of a slide, arms, gantry, arbor, head, ball screws, spindle, or ways for moving one or more of the optical pick-up and table with respect to the other; one or more motors positioned and configured to move one or more of the table or the optical pick-up with respect to the other; and at least one controller operably coupled to the optical pick-up and the one or more motors, wherein the controller is configured to activate the motors to move one or more of the optical pick-up or the table with respect to each other, direct the color laser to emit the colored light beam, direct the infrared laser to emit the infrared light beam and modulate an intensity of the infrared light beam according to a selected frequency, receive voltages from the photodetector corresponding to fluorescent signals detected at the photodetector, and determine a thermal diffusivity of the material sample at one or more locations thereon using the received voltages corresponding to the detected fluorescent radiation.

In some embodiments, the systems disclosed herein may include shielding between any of the components thereof. For example, one or more of the controller, the one or more actuators, and the optical arrangement may include shielding between the same and the table. In such examples, the shielding may serve to shield the components from harmful radiation. For example, when a radioactive sample is being tested, shielding between the controller and optical arrangement (except for an aperture for the probe, pump, and fluorescent light to pass through) and the radioactive material sample may shield the components from harmful gamma rays and prolong the life of the shielded components. In some embodiments, the shielding can include one or more of lead, tungsten, barium sulfate, depleted uranium or thorium, or any other material suitable for shielding x-rays, gamma rays, or other harmful radiation.

Figure 8:
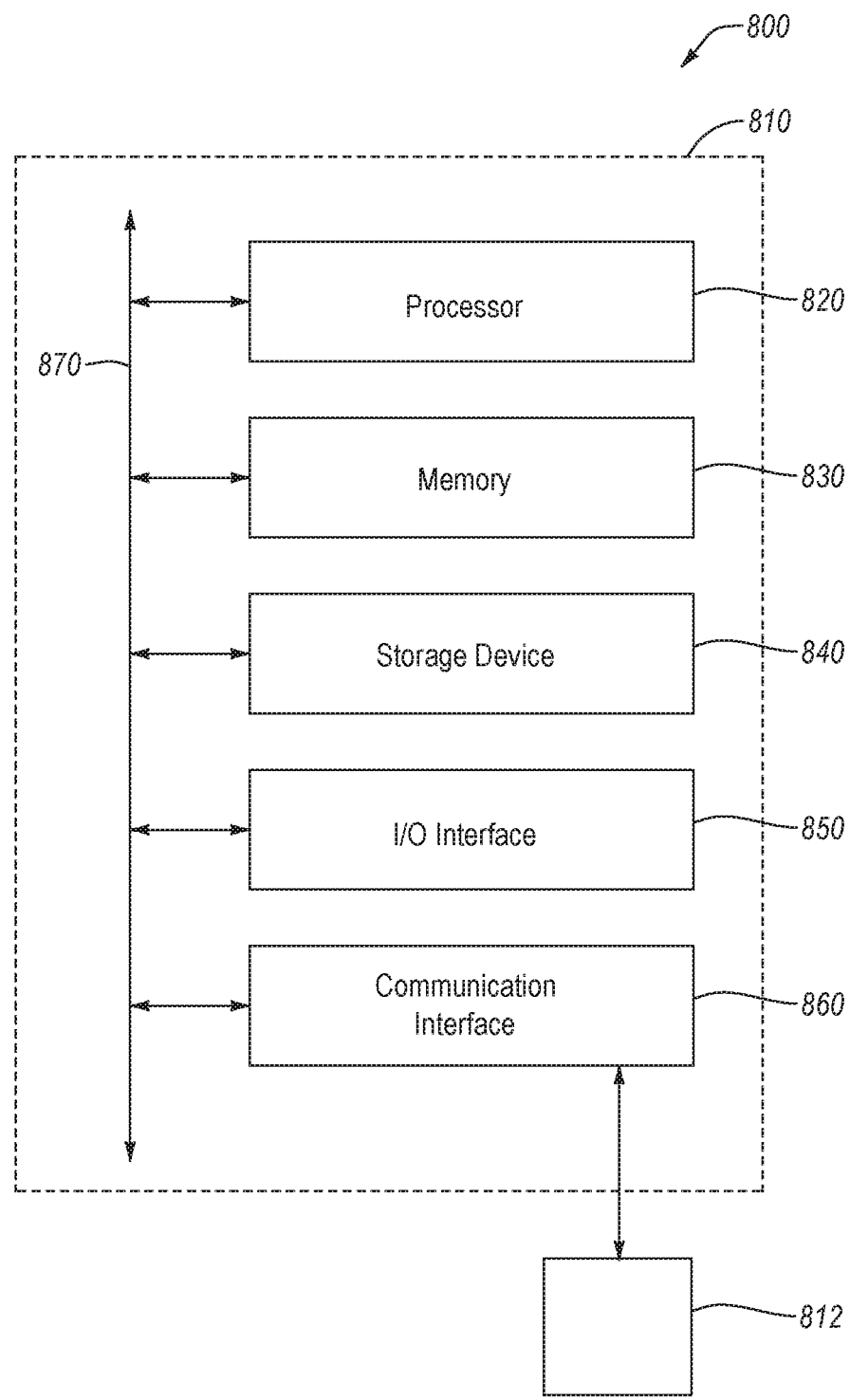
FIG. 8 is a schematic of a controller for executing any of the embodiments of methods disclosed herein, according to an embodiment.

Any of the example systems disclosed herein may be used to carry out any of the example methods disclosed herein, such as using the controller. FIG. 8 is a schematic of a controller 800 for executing any of the example methods disclosed herein, according to an embodiment. The controller 800 may be configured to implement any of the example methods disclosed herein, such as the method 100 or 600. The controller 800 includes at least one computing device 810. The at least one computing device 810 is an exemplary computing device that may be configured to perform one or more of the acts described above, such as the method 100 or 600. The at least one computing device 810 can include one or more servers, one or more computers (e.g., desk-top computer, lap-top computer), one or more mobile computing devices (e.g., smartphone, tablet, etc.), or one or more custom computing devices. The computing device 810 can comprise at least one processor 820, memory 830, a storage device 840, an input/output ("I/O") device/interface 850, and a communication interface 860. While an example computing device 810 is shown in FIG. 8, the components illustrated in FIG. 8 are not intended to be limiting of the controller 800 or computing device 810. Additional or alternative components may be used in some embodiments. Further, in some embodiments, the controller 800 or the computing device 810 can include fewer components than those shown in FIG. 8. For example, the controller 800 may not include the one or more additional computing devices 812. In some embodiments, the at least one computing device 810 may include a plurality of computing devices, such as a server farm, computational network, or cluster of computing devices. Components of computing device 810 shown in FIG. 8 are described in additional detail below. In some embodiments, one or more components of the controller 800 or the computing device 810 may be located remotely from one or more other components of the controller 800 or the computing device 810. In some embodiments, one or more components of the controller 800 or the computing device 810 may be located within or on the optical arrangement (FIGS. 7A and 7B).

In some embodiments, the processor(s) 820 includes hardware for executing instructions (e.g., instructions for carrying out one or more portions of any of the methods disclosed herein), such as those making up a computer program. For example, to execute instructions, the processor(s) 820 may retrieve (or fetch) the instructions from an internal register, an internal cache, the memory 830, or a storage device 840 and decode and execute them. In particular examples, processor(s) 820 may include one or more internal caches for data such as look-up tables or data libraries. As an example, the processor(s) 820 may include one or more instruction caches, one or more data caches, and one or more translation lookaside buffers (TLBs). Instructions in the instruction caches may be copies of instructions in memory 830 or storage device 840. In some embodiments, the processor 820 may be configured (e.g., include programming stored thereon or executed thereby) to carry out one or more portions of any of the example methods disclosed herein.

In some embodiments, the processor 820 is configured to perform any of the acts disclosed herein such as in method 100 or 600 or cause one or more portions of the computing device 810 or controller 800 to perform at least one of the acts disclosed herein. Such configuration can include one or more operational programs (e.g., computer program products) that are executable by the at least one processor 820. For example, the processor 820 may be configured to automatically determine the phase delay of a pattern of fluorescent signals emitted from the fluorescent indicator on the material sample (responsive to probe light) with respect to the pump light that irradiates the material sample while the probe light is emitted onto the material sample, as disclosed herein, according to an operational program for executing the same.

The at least one computing device 810 (e.g., a server) may include at least one memory storage medium (e.g., memory 830 and/or storage device 840). The computing device 810 may include memory 830, which is operably coupled to the processor(s) 820. The memory 830 may be used for storing data, metadata, and programs for execution by the processor(s) 820. The memory 830 may include one or more of volatile and non-volatile memories, such as Random Access Memory (RAM), Read Only Memory (ROM), a solid state disk (SSD), Flash, Phase Change Memory (PCM), or other types of data storage. The memory 830 may be internal or distributed memory.

The computing device 810 may include the storage device 840 having storage for storing data or instructions. The storage device 840 may be operably coupled to the at least one processor 820. In some embodiments, the storage device 840 can comprise a non-transitory memory storage medium, such as any of those described above. The storage device 840 (e.g., non-transitory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 840 may include removable or non-removable (or fixed) media. Storage device 840 may be internal or external to the computing device 810. In some embodiments, storage device 840 may include non-volatile, solid-state memory. In some embodiments, storage device 840 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these. In some embodiments, one or more portions of the memory 830 and/or storage device 840 (e.g., memory storage medium(s)) may store one or more databases thereon. At least some of the databases may be used to store one or more of modulation frequencies, signals (voltages) received form the photodetector corresponding to the fluorescent signals received by the photodetector, determined thermal diffusivities, or know thermal diffusivities corresponding to known materials, as disclosed herein.

In some embodiments, one or more of modulation frequencies, signals (voltages) received from the photodetector corresponding to the fluorescent signals received by the photodetector, determined thermal diffusivities, or known thermal diffusivities corresponding to known materials, may be stored in a memory storage medium such as one or more of the at least one processor 820 (e.g., internal cache of the processor), memory 830, or the storage device 840. In some embodiments, the at least one processor 820 may be configured to access (e.g., via bus 870) the memory storage medium(s) such as one or more of the memory 830 or the storage device 840. For example, the at least one processor 820 may receive and store the data (e.g., look-up tables) as a plurality of data points in the memory storage medium(s). The at least one processor 820 may execute programming stored therein adapted access the data in the memory storage medium(s) to automatically control the systems disclosed herein such as to determine the thermal diffusivity of a sample at one or more locations thereon. For example, the at least one processor 820 may access one or more look-up tables or operational programs in the memory storage medium(s) such as memory 830 or storage device 840. The one or more operational programs may include machine readable and executable instructions for directing the controller to perform or cause any components of any of the systems disclosed herein to perform any portions of the methods disclosed herein.

The computing device 810 also includes one or more I/O devices/interfaces 850, which are provided to allow a user to provide input to, receive output from, and otherwise transfer data to and from the computing device 810. These I/O devices/interfaces 850 may include a mouse, keypad or a keyboard, a touch screen, camera, optical scanner, network interface, web-based access, modem, a port, other known I/O devices or a combination of such I/O devices/interfaces 850. The touch screen may be activated with a stylus or a finger.

The I/O devices/interfaces 850 may include one or more devices for presenting output to a user, including, but not limited to, a graphics engine, a display (e.g., a display screen or monitor), one or more output drivers (e.g., display drivers), one or more audio speakers, and one or more audio drivers. In certain examples, I/O devices/interfaces 850 are configured to provide graphical data to a display for presentation to a user. The graphical data may be representative of one or more graphical user interfaces and/or any other graphical content as may serve a particular implementation.

The computing device 810 can further include a communication interface 860. The communication interface 860 can include hardware, software, or both. The communication interface 860 can provide one or more interfaces for communication (such as, for example, packet-based communication) between the computing device 810 and one or more additional computing devices 812 or one or more networks. For example, communication interface 860 may include a network interface controller (NIC) or network adapter for communicating with an Ethernet or other wire-based network or a wireless NIC (WNIC) or wireless adapter for communicating with a wireless network, such as a WI-FI.

Any suitable network and any suitable communication interface 860 may be used. For example, computing device 810 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of controller 800 or computing device 810 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 810 may include any suitable communication interface 860 for any of these networks, where appropriate.

The computing device 810 may include a bus 870. The bus 870 can include hardware, software, or both that couples components of computing device 810 to each other. For example, bus 870 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the examples of acts described herein, such as in the method 100 or 600 may be initiated, directed, or performed by and/or at the computing device 810. In some embodiments, the controller 720 may be similar or identical to the controller 800 in one or more aspects.

While various aspects and embodiments have been disclosed herein, other aspects and embodiments are contemplated. The various aspects and embodiments disclosed herein are for purposes of illustration and are not intended to be limiting.

What is claimed is:

1. A method for determining a thermal property of one or more portions of a material sample, the method comprising:
   a) disposing a fluorescent indicator on a surface of the material sample;

b) illuminating a surface of the material sample with an infrared light from a pump light source and a probe light of a probe light source at an initial location on the surface;

c) modulating an intensity of the infrared light at an initial modulation frequency;

d) detecting fluorescent signals from the fluorescent indicator at a photodetector, over a duration, responsive to fluorescent emissions induced via the probe light from the probe light source;

e) altering the initial modulation frequency of the infrared light to an altered modulation frequency;

f) performing acts b)-e) at the altered modulation frequency; and g) determining the thermal property partially based on the fluorescent emissions;

wherein the probe light source, the pump light source, and the photodetector are disposed in a Blu-ray optical pick-up.

2. The method of claim 1, wherein disposing a fluorescent indicator on a surface of the material sample includes disposing quantum dots on the surface of the material sample.

3. The method of claim 1, wherein illuminating a surface of the material sample with an infrared light from a pump light source and a probe light of a probe light source at an initial location on the surface includes illuminating the surface of the material sample with an infrared laser and a color laser at the initial location on the surface, wherein the color laser emits colored light at a substantially fixed intensity and the colored light is concentrically disposed within a beam of infrared light from the infrared laser.

4. The method of claim 1, wherein modulating an intensity of the infrared light at an initial modulation frequency includes modulating the intensity of the infrared light in a sinusoidal pattern of increasing and decreasing intensities.

5. The method of claim 1, wherein altering the initial modulation frequency of the infrared light to an altered modulation frequency includes altering the initial modulation frequency of the infrared light to the altered modulation frequency, wherein the altered modulation frequency is a different frequency than the initial modulation frequency.

6. The method of claim 1, wherein determining the thermal property partially based on the fluorescent emissions includes determining a thermal diffusivity of the material sample at the initial location.

7. The method of claim 1, wherein determining the thermal property partially based on the fluorescent emissions includes:

determining a phase delay in a pattern of intensity of fluorescent signals with respect to the modulated intensity of the infrared light corresponding thereto;

determining an amplitude of the pattern of fluorescent signals received by the photodetector, wherein the pattern of fluorescent signals corresponds to a phase delayed signal compared to the modulated intensity of the infrared light corresponding thereto; and determining a thermal diffusivity of the material sample at one or more points thereon by solving the heat equation at each of the one or more points.

8. The method of claim 7, wherein determining the thermal diffusivity of the material sample at one or more points thereon by solving the heat equation at each of the one or more points includes:

determining the amplitude and phase of each pattern of fluorescent signals as a function of a corresponding modulation frequency of the infrared laser; and using the amplitudes and phase delays of the patterns of fluorescent signals, as a function of the corresponding modulation frequencies of the infrared laser, to solve for thermal diffusivity of the material sample at each of the one or more points using the heat equation.

9. A method for determining a material property, the method comprising:

a) disposing a fluorescent indicator on a surface of a material sample;

b) illuminating the surface of the material sample with an infrared light from a pump light source and a probe light from a probe light source at an initial location on the surface, wherein probe light is emitted at a substantially fixed intensity and is concentrically disposed within a beam of the infrared light;

c) modulating an intensity of the infrared light at an initial modulation frequency;

d) detecting fluorescent signals from the fluorescent indicator at a photodetector, over a duration, responsive to fluorescent emissions induced via illumination of the fluorescent indicator by the probe light, wherein fluorescent signals have a phase delay at the initial modulation frequency compared to the infrared light, and wherein the infrared light, the probe light, and the photodetector are disposed in a commercial off-the-shelf high definition Blu-ray optical pick-up ("optical pick-up");

e) determining the phase delay in a pattern of the intensity of the fluorescent signals with respect to the initial modulation frequency of the infrared light, wherein the pattern of the fluorescent signals corresponds to a phase delay at the initial modulation frequency of the infrared light;

f) determining an amplitude of the pattern of the fluorescent signals detected at the photodetector;

g) altering the initial modulation frequency to an altered modulation frequency having a higher or lower frequency than a current modulation frequency, and performing acts d)-f) at the altered modulation frequency; and h) determining a thermal diffusivity of one or more points of the material sample at least partially based on the fluorescent emissions.

10. The method of claim 9, wherein determining the thermal diffusivity of one or more points of the material sample at least partially based on the fluorescent emissions includes:

determining the amplitude and phase of each pattern of fluorescent signals as a function of a corresponding modulation frequency of the infrared light; and using the amplitude and phase delay of the pattern of fluorescent signals, as a function of the corresponding modulation frequencies of the infrared light, to solve for the thermal diffusivity of the material sample at each of the one or more points using the heat equation.

11. The method of claim 9, further comprising:

moving the optical pick-up to at least one additional location on the surface;

repeating acts b)-h); and determining if the thermal diffusivity at the initial location and the at least one additional location is different.

12. The method of claim 11, further comprising comparing the thermal diffusivity of the material sample at the initial location and the at least one additional location to determine if the material sample is homogenous.

13. A system for determining a thermal diffusivity of a material sample, the system comprising:

an optical arrangement including a pump light source, a probe light source, and a photodetector, wherein the probe light source is configured to emit probe light, wherein the pump light source is configured to emit infrared light, and wherein the optical arrangement includes a Blu-ray optical pick-up;

a support configured to have material samples mounted thereover;

one or more first actuators configured to move one or more of the optical arrangement or the support with respect to the other;

one or more second actuators positioned and configured to move one or more of the support or the optical arrangement with respect to the other; and at least one controller operably coupled to the optical arrangement and the one or more first and second actuators, wherein the controller is configured to:
  activate the one or more second actuators to move one or more of the optical arrangement or the support with respect to each other;
  direct the probe light source to emit the probe light;
  direct the pump light source to emit the infrared light and modulate an intensity of the infrared light according to a selected frequency;
  receive electrical signals from the photodetector corresponding to fluorescent signals detected at the photodetector; and
  determine a thermal diffusivity of the material sample at one or more locations thereon using the received electrical signals corresponding to the fluorescent signals detected at the photodetector.

14. The system of claim 13, wherein the controller is configured to:
  determine a phase delay in a pattern of the received electrical signals with respect to a modulation frequency of the intensity of the infrared light, wherein the pattern of received electrical signals corresponds to the fluorescent signals detected at the modulation frequency;
  determine an amplitude of the pattern of the received electrical signals corresponding to the fluorescent signals, wherein the pattern of the received electrical signals corresponds to the fluorescent signal strength at the modulation frequency;
  alter the modulation frequency of the intensity of the infrared light to a higher or lower frequency than a current modulation frequency, to emit infrared light at an altered modulation frequency,
  determine the phase delay and amplitude of the pattern of the received electrical signals at the altered modulation frequency; and
  solve for thermal diffusivity of the material sample at one or more locations thereon using the heat equation.

15. The system of claim 14, wherein the controller is configured to:
  plot the amplitude and phase of each pattern of received electrical signals as a function of frequency of modulation of the infrared light corresponding thereto; and
  use the plotted amplitudes and phases of the patterns of received electrical signals to solve for thermal diffusivity of the material sample at the one or more locations using the heat equation.

16. The system of claim 13, wherein the one or more second actuators include a servo-motor or a stepper motor configured to hold a tolerance of movement in one or more directions that is less than 1 mm.

17. The system of claim 13, wherein the controller is configured to:
  direct the one or more first and second actuators to move one or more of the optical arrangement or the support, with respect to each other, from an initial location at which an initial interrogation takes place to at least one additional location that is different than the initial location;
  direct the probe light source to emit the probe light at the initial location and the at least one additional location;
  direct the pump light source to emit the infrared light at the initial location and the at least one additional location, and modulate an intensity of the infrared light according to a selected frequency or one or more altered frequencies;
  receive electrical signals from the photodetector corresponding to the fluorescent signals detected at the photodetector; and
  determine the thermal diffusivity of the material sample at the initial location and the at least one additional location thereon using the received electrical signals corresponding to the fluorescent signals detected at the photodetector.

18. The system of claim 17, wherein the controller is configured to compare the thermal diffusivities of the material sample at the initial location and the at least an additional location to determine if the material sample has a different composition at the initial location than at the at least one additional location.

19. The system of claim 17, wherein the controller is configured to compare the thermal diffusivity of the material sample at one or more of the initial location and the at least an additional location to one or more reference thermal diffusivities of known materials to determine if the known material is present in the material sample.

20. The system of claim 13, wherein the probe source is positioned and configured to emit the probe light concentrically within the infrared light.

* * * * *